US00RE43084E

(19) United States
(12) Reissued Patent
Fujioka

(10) Patent Number: US RE43,084 E
(45) Date of Reissued Patent: Jan. 10, 2012

(54) METHOD AND APPARATUS FOR INPUTTING INFORMATION INCLUDING COORDINATE DATA

(75) Inventor: Susumu Fujioka, Zama (JP)

(73) Assignee: SMART Technologies ULC (CA)

(21) Appl. No.: 12/722,345

(22) Filed: Mar. 11, 2010

Related U.S. Patent Documents

Reissue of:
(64) Patent No.: 7,342,574
Issued: Mar. 11, 2008
Appl. No.: 10/717,456
Filed: Nov. 21, 2003

U.S. Applications:
(63) Continuation of application No. 09/698,031, filed on Oct. 30, 2000, now Pat. No. 6,674,424.

(30) Foreign Application Priority Data

Oct. 29, 1999 (JP) ..... 11-309412

(51) Int. Cl.
*G06F 3/042* (2006.01)
*G06F 3/041* (2006.01)

(52) U.S. Cl. ..... 345/175; 345/173; 178/18.01

(58) Field of Classification Search ..... 345/173–183; 178/18.01
See application file for complete search history.

(56) References Cited

U.S. PATENT DOCUMENTS 4,107,522 A 8/1978 Walter
4,144,449 A 3/1979 Funk et al.
4,247,767 A 1/1981 O'Brien et al.
4,507,557 A 3/1985 Tsikos
4,558,313 A 12/1985 Garwin et al.
4,672,364 A 6/1987 Lucas
4,737,631 A 4/1988 Sasaki et al.
4,742,221 A 5/1988 Sasaki et al.
4,746,770 A 5/1988 McAvinney
4,762,990 A 8/1988 Caswell et al.
4,782,328 A 11/1988 Denlinger
4,818,826 A 4/1989 Kimura
4,820,050 A 4/1989 Griffin
4,822,145 A 4/1989 Staelin
4,831,455 A 5/1989 Ishikawa
4,868,912 A 9/1989 Doering
4,980,547 A 12/1990 Griffin
(Continued)

FOREIGN PATENT DOCUMENTS

CA 2412878 A1 1/2002
(Continued)

OTHER PUBLICATIONS

International Search Report and Written Opinion for PCT/CA2004/001759 mailed Feb. 21, 2005 (7 Pages).

(Continued)

*Primary Examiner* — Richard Hjerpe
*Assistant Examiner* — Dorothy Harris
(74) *Attorney, Agent, or Firm* — Katten Muchin Rosenman LLP

(57) ABSTRACT

A method, computer readable medium, and apparatus for inputting information, including coordinate data, includes: extracting a predetermined object from an image, including a predetermined object above a plane; detecting motion of the predetermined object while the predetermined object is within a predetermined distance from the plane; and then determining if to input predetermined information.

12 Claims, 22 Drawing Sheets

U.S. PATENT DOCUMENTS

| | | | | |
|---|---|---|---|---|
| 5,025,314 | A | | 6/1991 | Tang et al. |
| 5,097,516 | A | | 3/1992 | Amir |
| 5,109,435 | A | | 4/1992 | Lo et al. |
| 5,130,794 | A | | 7/1992 | Ritchey |
| 5,140,647 | A | | 8/1992 | Ise et al. |
| 5,162,618 | A | | 11/1992 | Knowles |
| 5,168,531 | A | | 12/1992 | Sigel |
| 5,196,835 | A | | 3/1993 | Blue et al. |
| 5,239,373 | A | | 8/1993 | Tang et al. |
| 5,317,140 | A | * | 5/1994 | Dunthorn ..... 250/221 |
| 5,359,155 | A | | 10/1994 | Helser |
| 5,374,971 | A | | 12/1994 | Clapp et al. |
| 5,414,413 | A | | 5/1995 | Tamaru et al. |
| 5,448,263 | A | | 9/1995 | Martin |
| 5,483,261 | A | | 1/1996 | Yasutake |
| 5,483,603 | A | | 1/1996 | Luke et al. |
| 5,484,966 | A | | 1/1996 | Segen |
| 5,490,655 | A | | 2/1996 | Bates |
| 5,502,568 | A | | 3/1996 | Ogawa et al. |
| 5,525,764 | A | | 6/1996 | Junkins et al. |
| 5,528,263 | A | | 6/1996 | Platzker et al. |
| 5,528,290 | A | | 6/1996 | Saund |
| 5,537,107 | A | | 7/1996 | Funado |
| 5,554,828 | A | | 9/1996 | Primm |
| 5,581,276 | A | | 12/1996 | Cipolla et al. |
| 5,581,637 | A | | 12/1996 | Cass et al. |
| 5,594,469 | A | | 1/1997 | Freeman et al. |
| 5,594,502 | A | | 1/1997 | Bito et al. |
| 5,617,312 | A | * | 4/1997 | Iura et al. ..... 700/83 |
| 5,638,092 | A | | 6/1997 | Eng et al. |
| 5,670,755 | A | | 9/1997 | Kwon |
| 5,686,942 | A | | 11/1997 | Ball |
| 5,729,704 | A | | 3/1998 | Stone et al. |
| 5,734,375 | A | | 3/1998 | Knox et al. |
| 5,736,686 | A | | 4/1998 | Perret, Jr. et al. |
| 5,737,740 | A | | 4/1998 | Henderson et al. |
| 5,745,116 | A | | 4/1998 | Pisutha-Arnond |
| 5,764,223 | A | | 6/1998 | Chang et al. |
| 5,771,039 | A | | 6/1998 | Ditzik |
| 5,790,910 | A | | 8/1998 | Haskin |
| 5,801,704 | A | | 9/1998 | Oohara et al. |
| 5,818,421 | A | | 10/1998 | Ogino et al. |
| 5,818,424 | A | | 10/1998 | Korth |
| 5,819,201 | A | | 10/1998 | DeGraaf |
| 5,825,352 | A | | 10/1998 | Bisset et al. |
| 5,831,602 | A | | 11/1998 | Sato et al. |
| 5,911,004 | A | | 6/1999 | Ohuchi et al. |
| 5,914,709 | A | | 6/1999 | Graham et al. |
| 5,920,342 | A | | 7/1999 | Umeda et al. |
| 5,936,615 | A | | 8/1999 | Waters |
| 5,943,783 | A | | 8/1999 | Jackson |
| 5,963,199 | A | | 10/1999 | Kato et al. |
| 5,982,352 | A | | 11/1999 | Pryor |
| 5,988,645 | A | | 11/1999 | Downing |
| 6,002,808 | A | | 12/1999 | Freeman |
| 6,008,798 | A | | 12/1999 | Mato, Jr. et al. |
| 6,031,531 | A | | 2/2000 | Kimble |
| 6,061,177 | A | | 5/2000 | Fujimoto |
| 6,075,905 | A | | 6/2000 | Herman et al. |
| 6,100,538 | A | | 8/2000 | Ogawa |
| 6,104,387 | A | | 8/2000 | Chery et al. |
| 6,118,433 | A | | 9/2000 | Jenkin et al. |
| 6,122,865 | A | | 9/2000 | Branc et al. |
| 6,128,003 | A | | 10/2000 | Smith et al. |
| 6,141,000 | A | | 10/2000 | Martin |
| 6,147,678 | A | | 11/2000 | Kumar et al. |
| 6,153,836 | A | | 11/2000 | Goszyk |
| 6,161,066 | A | | 12/2000 | Wright et al. |
| 6,179,426 | B1 | | 1/2001 | Rodriguez, Jr. et al. |
| 6,188,388 | B1 | | 2/2001 | Arita et al. |
| 6,191,773 | B1 | | 2/2001 | Maruno et al. |
| 6,208,329 | B1 | | 3/2001 | Ballare |
| 6,208,330 | B1 | | 3/2001 | Hasegawa et al. |
| 6,209,266 | B1 | | 4/2001 | Branc et al. |
| 6,226,035 | B1 | | 5/2001 | Korein et al. |
| 6,229,529 | B1 | | 5/2001 | Yano et al. |
| 6,252,989 | B1 | | 6/2001 | Geisler et al. |
| 6,256,033 | B1 | | 7/2001 | Nguyen |
| 6,262,718 | B1 | | 7/2001 | Findlay et al. |
| 6,310,610 | B1 | | 10/2001 | Beaton et al. |
| 6,323,846 | B1 | | 11/2001 | Westerman et al. |
| 6,328,270 | B1 | | 12/2001 | Elberbaum |
| 6,335,724 | B1 | | 1/2002 | Takekawa et al. |
| 6,337,681 | B1 | | 1/2002 | Martin |
| 6,339,748 | B1 | | 1/2002 | Hiramatsu |
| 6,353,434 | B1 | | 3/2002 | Akebi et al. |
| 6,359,612 | B1 | | 3/2002 | Peter et al. |
| 6,414,671 | B1 | | 7/2002 | Gillespie et al. |
| 6,414,673 | B1 | | 7/2002 | Wood et al. |
| 6,421,042 | B1 | | 7/2002 | Omura et al. |
| 6,427,389 | B1 | | 8/2002 | Branc et al. |
| 6,429,856 | B1 | | 8/2002 | Omura et al. |
| 6,496,122 | B2 | | 12/2002 | Sampsell |
| 6,497,608 | B2 | | 12/2002 | Ho et al. |
| 6,498,602 | B1 | | 12/2002 | Ogawa |
| 6,507,339 | B1 | | 1/2003 | Tanaka |
| 6,512,838 | B1 | | 1/2003 | Rafii et al. |
| 6,517,266 | B2 | | 2/2003 | Saund |
| 6,518,600 | B1 | | 2/2003 | Shaddock |
| 6,522,830 | B2 | | 2/2003 | Yamagami |
| 6,529,189 | B1 | | 3/2003 | Colgan et al. |
| 6,530,664 | B2 | | 3/2003 | Vanderwerf et al. |
| 6,531,999 | B1 | | 3/2003 | Trajkovic |
| 6,545,669 | B1 | | 4/2003 | Kinawi et al. |
| 6,559,813 | B1 | | 5/2003 | DeLuca et al. |
| 6,563,491 | B1 | | 5/2003 | Omura |
| 6,567,078 | B2 | | 5/2003 | Ogawa |
| 6,567,121 | B1 | | 5/2003 | Kuno |
| 6,570,612 | B1 | | 5/2003 | Saund et al. |
| 6,577,299 | B1 | | 6/2003 | Schiller et al. |
| 6,587,099 | B2 | | 7/2003 | Takekawa |
| 6,594,023 | B1 | | 7/2003 | Omura et al. |
| 6,597,348 | B1 | | 7/2003 | Yamazaki et al. |
| 6,608,619 | B2 | | 8/2003 | Omura et al. |
| 6,626,718 | B2 | | 9/2003 | Hiroki |
| 6,630,922 | B2 | | 10/2003 | Fishkin et al. |
| 6,633,328 | B1 | | 10/2003 | Byrd et al. |
| 6,650,822 | B1 | | 11/2003 | Zhou |
| 6,674,424 | B1 | | 1/2004 | Fujioka |
| 6,683,584 | B2 | | 1/2004 | Ronzani et al. |
| 6,690,357 | B1 | | 2/2004 | Dunton et al. |
| 6,690,363 | B2 | | 2/2004 | Newton |
| 6,690,397 | B1 | | 2/2004 | Daignault, Jr. |
| 6,710,770 | B2 | | 3/2004 | Tomasi et al. |
| 6,736,321 | B2 | | 5/2004 | Tsikos et al. |
| 6,741,250 | B1 | | 5/2004 | Furlan et al. |
| 6,747,636 | B2 | | 6/2004 | Martin |
| 6,756,910 | B2 | | 6/2004 | Ohba et al. |
| 6,760,009 | B2 | | 7/2004 | Omura et al. |
| 6,760,999 | B2 | | 7/2004 | Branc et al. |
| 6,774,889 | B1 | | 8/2004 | Zhang et al. |
| 6,803,906 | B1 | | 10/2004 | Morrison et al. |
| 6,864,882 | B2 | | 3/2005 | Newton |
| 6,911,972 | B2 | | 6/2005 | Brinjes |
| 6,919,880 | B2 | | 7/2005 | Morrison et al. |
| 6,933,981 | B1 | | 8/2005 | Kishida et al. |
| 6,947,032 | B2 | | 9/2005 | Morrison et al. |
| 6,954,197 | B2 | | 10/2005 | Morrison et al. |
| 6,972,401 | B2 | | 12/2005 | Akitt et al. |
| 6,972,753 | B1 | | 12/2005 | Kimura et al. |
| 7,007,236 | B2 | | 2/2006 | Dempski et al. |
| 7,015,418 | B2 | | 3/2006 | Cahill et al. |
| 7,030,861 | B1 | | 4/2006 | Westerman et al. |
| 7,084,868 | B2 | | 8/2006 | Farag et al. |
| 7,098,392 | B2 | | 8/2006 | Sitrick et al. |
| 7,121,470 | B2 | | 10/2006 | McCall et al. |
| 7,176,904 | B2 | | 2/2007 | Satoh |
| 7,184,030 | B2 | | 2/2007 | McCharles et al. |
| 7,187,489 | B2 | | 3/2007 | Miles |
| 7,190,496 | B2 | | 3/2007 | Klug et al. |
| 7,202,860 | B2 | | 4/2007 | Ogawa |
| 7,232,986 | B2 | | 6/2007 | Worthington et al. |
| 7,236,162 | B2 | | 6/2007 | Morrison et al. |
| 7,274,356 | B2 | | 9/2007 | Ung et al. |
| 7,355,593 | B2 | | 4/2008 | Hill et al. |
| 7,414,617 | B2 | | 8/2008 | Ogawa |
| 7,619,617 | B2 | | 11/2009 | Morrison et al. |

| | | | |
|---|---|---|---|
| 7,692,625 | B2 | 4/2010 | Morrison et al. |
| 2001/0019325 | A1 | 9/2001 | Takekawa |
| 2001/0022579 | A1 | 9/2001 | Hirabayashi |
| 2001/0026268 | A1 | 10/2001 | Ito |
| 2001/0033274 | A1 | 10/2001 | Ong |
| 2002/0036617 | A1 | 3/2002 | Pryor |
| 2002/0050979 | A1 | 5/2002 | Oberoi et al. |
| 2002/0067922 | A1 | 6/2002 | Harris |
| 2002/0080123 | A1 | 6/2002 | Kennedy et al. |
| 2002/0145595 | A1 | 10/2002 | Satoh |
| 2002/0163530 | A1 | 11/2002 | Takakura et al. |
| 2003/0001825 | A1 | 1/2003 | Omura et al. |
| 2003/0025951 | A1 | 2/2003 | Pollard et al. |
| 2003/0043116 | A1 | 3/2003 | Morrison et al. |
| 2003/0046401 | A1 | 3/2003 | Abbott et al. |
| 2003/0063073 | A1 | 4/2003 | Geaghan et al. |
| 2003/0071858 | A1 | 4/2003 | Morohoshi |
| 2003/0085871 | A1* | 5/2003 | Ogawa ..... 345/158 |
| 2003/0095112 | A1 | 5/2003 | Kawano et al. |
| 2003/0142880 | A1 | 7/2003 | Hyodo |
| 2003/0151532 | A1 | 8/2003 | Chen et al. |
| 2003/0151562 | A1 | 8/2003 | Kulas |
| 2004/0021633 | A1 | 2/2004 | Rajkowski |
| 2004/0031779 | A1 | 2/2004 | Cahill et al. |
| 2004/0046749 | A1 | 3/2004 | Ikeda |
| 2004/0108990 | A1 | 6/2004 | Lieberman |
| 2004/0149892 | A1 | 8/2004 | Akitt et al. |
| 2004/0150630 | A1 | 8/2004 | Hinckley et al. |
| 2004/0169639 | A1 | 9/2004 | Pate et al. |
| 2004/0178993 | A1 | 9/2004 | Morrison et al. |
| 2004/0178997 | A1 | 9/2004 | Gillespie et al. |
| 2004/0179001 | A1 | 9/2004 | Morrison et al. |
| 2004/0189720 | A1 | 9/2004 | Wilson et al. |
| 2004/0252091 | A1 | 12/2004 | Ma et al. |
| 2005/0052427 | A1 | 3/2005 | Wu et al. |
| 2005/0057524 | A1 | 3/2005 | Hill et al. |
| 2005/0083308 | A1 | 4/2005 | Homer et al. |
| 2005/0151733 | A1 | 7/2005 | Sander et al. |
| 2005/0190162 | A1 | 9/2005 | Newton |
| 2005/0248540 | A1 | 11/2005 | Newton |
| 2005/0276448 | A1 | 12/2005 | Pryor |
| 2006/0022962 | A1 | 2/2006 | Morrison et al. |
| 2006/0158437 | A1 | 7/2006 | Blythe et al. |
| 2006/0202953 | A1 | 9/2006 | Pryor et al. |
| 2006/0227120 | A1 | 10/2006 | Eikman |
| 2006/0274067 | A1 | 12/2006 | Hikai |
| 2007/0019103 | A1 | 1/2007 | Lieberman et al. |
| 2007/0075648 | A1 | 4/2007 | Blythe et al. |
| 2007/0075982 | A1 | 4/2007 | Morrison et al. |
| 2007/0116333 | A1 | 5/2007 | Dempski et al. |
| 2007/0126755 | A1 | 6/2007 | Zhang et al. |
| 2007/0139932 | A1 | 6/2007 | Sun et al. |
| 2007/0236454 | A1 | 10/2007 | Ung et al. |
| 2008/0062149 | A1 | 3/2008 | Baruk |
| 2008/0129707 | A1 | 6/2008 | Pryor |

FOREIGN PATENT DOCUMENTS

| | | | |
|---|---|---|---|
| CA | 2493236 | A1 | 12/2003 |
| DE | 198 10 452 | A1 | 12/1998 |
| EP | 0 279 652 | A2 | 8/1988 |
| EP | 0 347 725 | A2 | 12/1989 |
| EP | 0 657 841 | A1 | 6/1995 |
| EP | 0 762 319 | A2 | 3/1997 |
| EP | 0 829 798 | A2 | 3/1998 |
| EP | 1 450 243 | A2 | 8/2004 |
| EP | 1 297 488 | B1 | 11/2006 |
| GB | 2204126 | A | 11/1988 |
| JP | 57-211637 | A | 12/1982 |
| JP | 61-196317 | | 8/1986 |
| JP | 61-196317 | A | 8/1986 |
| JP | 61-260322 | A | 11/1986 |
| JP | 03-054618 | | 3/1991 |
| JP | 3-054618 | A | 3/1991 |
| JP | 4-350715 | A | 12/1992 |
| JP | 04-355815 | | 12/1992 |
| JP | 4-355815 | A | 12/1992 |
| JP | 5-181605 | A | 7/1993 |
| JP | 05-189137 | | 7/1993 |
| JP | 5-189137 | A | 7/1993 |
| JP | 5-197810 | | 8/1993 |
| JP | 5-197810 | A | 8/1993 |
| JP | 07-110733 | | 4/1995 |
| JP | 7-110733 | A | 4/1995 |
| JP | 07-230352 | | 8/1995 |
| JP | 7-230352 | A | 8/1995 |
| JP | 8-16931 | | 2/1996 |
| JP | 8-016931 | B2 | 2/1996 |
| JP | 8-108689 | A | 4/1996 |
| JP | 8-240407 | A | 9/1996 |
| JP | 8-315152 | | 11/1996 |
| JP | 8-315152 | A | 11/1996 |
| JP | 9-091094 | A | 4/1997 |
| JP | 9-224111 | A | 8/1997 |
| JP | 9-319501 | A | 12/1997 |
| JP | 10-105324 | A | 4/1998 |
| JP | 11-051644 | A | 2/1999 |
| JP | 11-064026 | | 3/1999 |
| JP | 11-064026 | A | 3/1999 |
| JP | 11-85376 | | 3/1999 |
| JP | 11-085376 | A | 3/1999 |
| JP | 11-110116 | | 4/1999 |
| JP | 11-110116 | A | 4/1999 |
| JP | 2000-105671 | | 4/2000 |
| JP | 2000-105671 | A | 4/2000 |
| JP | 2000-132340 | | 5/2000 |
| JP | 2000-132340 | A | 5/2000 |
| JP | 2001-075735 | A | 3/2001 |
| JP | 2001-282456 | A | 10/2001 |
| JP | 2001-282457 | A | 10/2001 |
| JP | 2002-236547 | A | 8/2002 |
| JP | 2003-158597 | A | 5/2003 |
| JP | 2003-167669 | A | 6/2003 |
| JP | 2003-173237 | A | 6/2003 |
| WO | 98/07112 | A2 | 2/1998 |
| WO | 99/08897 | A1 | 2/1999 |
| WO | 99/21122 | A1 | 4/1999 |
| WO | 99/28812 | A1 | 6/1999 |
| WO | 99/40562 | A1 | 8/1999 |
| WO | 02/03316 | A1 | 1/2002 |
| WO | 02/07073 | A2 | 1/2002 |
| WO | 02/27461 | A1 | 4/2002 |
| WO | 03/105074 | A2 | 12/2003 |
| WO | 2005/106775 | A1 | 11/2005 |
| WO | 2007/003196 | A2 | 1/2007 |
| WO | 2007/064804 | A1 | 6/2007 |

OTHER PUBLICATIONS

International Search Report for PCT/CA01/00980 mailed Oct. 22, 2001 (3 Pages).

International Search Report and Written Opinion for PCT/CA2009/000773 mailed Aug. 12, 2009 (11 Pages).

European Search Report for EP 06 01 9269 dated Nov. 9, 2006 (4 pages).

European Search Report for EP 06 01 9268 dated Nov. 9, 2006 (4 pages).

European Search Report for EP 04 25 1392 dated Jan. 11, 2007 (2 pages).

European Search Report for EP 02 25 3594 dated Dec. 14, 2005 (3 pages).

Partial European Search Report for EP 03 25 7166 dated May 19, 2006 (4 pages).

May 12, 2009 Office Action for Canadian Patent Application No. 2,412,878 (4 pages).

Förstner, Wolfgang, "On Estimating Rotations", Festschrift für Prof. Dr. -Ing. Heinrich Ebner Zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).

Funk, Bud K., CCD's in optical panels deliver high resolution, Electronic Design, Sep. 27, 1980, pp. 139-143.

Hartley, R. and Zisserman, A., "Multiple View Geometry in Computer Vision", Cambridge University Press, First published 2000, Reprinted (with corrections) 2001, pp. 70-73, 92-93, and 98-99.

Kanatani, K., "Camera Calibration", Geometric Computation for Machine Vision, Oxford Engineering Science Series, vol. 37, 1993, pp. 56-63.
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988 (Nov. 14, 1988), pp. 1123-1132.
Wang, F., et al., "Stereo camera calibration without absolute world coordinate information", SPIE, vol. 2620, pp. 655-662, Jun. 14, 1995.
Wrobel, B., "minimum Solutions for Orientation", Calibration and Orientation of Cameras in Computer Vision, Springer Series in Information Sciences, vol. 34, 2001, pp. 28-33.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
Jul. 5, 2010 Office Action, with English translation, for Japanese Patent Application No. 2005-000268 (6 pages).
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).
Villamor et al. "Touch Gesture Reference Guide", Apr. 15, 2010.

* cited by examiner

METHOD AND APPARATUS FOR INPUTTING INFORMATION INCLUDING COORDINATE DATA

Matter enclosed in heavy brackets [ ] appears in the original patent but forms no part of this reissue specification; matter printed in italics indicates the additions made by reissue.

CROSS-REFERENCE TO RELATED APPLICATION

This document is a continuation of U.S. application Ser. No. 09/698,031 filed on Oct. 30, 2000, and is based on Japanese patent application No. 11-309412 filed in the Japanese Patent Office on Oct. 29, 1999, the entire contents of each of which are incorporated herein by reference.

BACKGROUND OF THE INVENTION

1. Field of the Invention

The present invention relates to a method and apparatus for inputting information including coordinate data. More particularly, the present invention relates to a method and apparatus for inputting information including coordinate data of a location of a coordinate input member, such as a pen, a human finger, etc., on an image displayed on a relatively large screen.

2. Discussion of the Background

Lately, presentation systems, electronic copy boards, or electronic blackboard systems provided with a relatively large screen display device, such as a plasma display panel, a rear projection display, etc., are coming into wide use. Certain type of presentation systems also provide a touch input device disposed in front of a screen for inputting information related to the image displayed on the screen. Such a touch input device is also referred as an electronic tablet, an electronic pen, etc.

As to such a presentation system, for example, when a user of the system touches an icon on a display screen, a touch input device detects and inputs the touching motion and the coordinates of the touched location. Similarly, when the user draws a line, the touch input device repetitively detects and inputs a plurality of coordinates as a locus of the drawn line.

As an example, Japanese Laid-Open Patent Publication No. 11-85376 describes a touch input apparatus provided with light reflecting devices disposed around a display screen, light beam scanning devices, and light detectors. The light reflecting device has a characteristic to reflect incident light toward a direction close to the incident light. During an operation of the apparatus, scanning light beams emitted by the light beam scanning devices are reflected by the light reflecting devices, and then received by the light detectors. When a coordinate input member, such as a pen, a user's finger, etc., touches the surface of the screen at a location, the coordinate input member interrupts the path of the scanning light beams, and thereby the light detector is able to detect the touched location as a missing of the scanning light beams at the touched location.

In this apparatus, when a certain location-detecting accuracy in a direction perpendicular to the screen is required, the scanning light beams are desired to be thin and to scan on a plane close enough to the screen. Meanwhile, when the surface of the screen is contorted, the contorted surface may interfere with the transmission of the scanning light beams, and consequently a coordinate input operation might be impaired. As a result, for example, a double-click operation might not be properly detected, free hand drawing lines and characters might be erroneously detected, and so forth.

As another example, Japanese Laid-Open Patent Publication No. 61-196317 describes a touch input apparatus provided with a plurality of television cameras. In the apparatus, the plurality of television cameras detect three-dimensional coordinates of a moving object, such as a pen, as a coordinate input member. Because the apparatus detects a three-dimensional coordinates, the plurality of television cameras are desirable to capture images of the moving object at a relatively high flame rate.

As further example, a touch input apparatus provided with an electro magnetic tablet and an electromagnetic stylus is known. In this apparatus, a location of the stylus is detected based on electromagnetic induction between the tablet and the stylus. Therefore, a distance between the tablet and the stylus tends to be limited in a rather short distance, for example, eight millimeters; otherwise a large size stylus or a battery powered stylus is used.

SUMMARY OF THE INVENTION

The present invention has been made in view of the above-discussed and other problems and to overcome the above-discussed and other problems associated with the background methods and apparatus. Accordingly, an object of the present invention is to provide a novel method and apparatus that can input information including coordinate data even when the surface of a display screen is contorted to a certain extent and without using a light scanning device.

Another object of the present invention is to provide a novel method and apparatus that can input information including coordinate data using a plurality of coordinate input members, such as a pen, a human finger, a stick, a rod, a chalk, etc.

Another object of the present invention is to provide a novel method and apparatus that can input information including coordinate data with a plurality of background devices, such as a chalkboard, a whiteboard, etc., in addition to a display device, such as a plasma display panel, a rear projection display.

To achieve these and other objects, the present invention provides a method, computer readable medium and apparatus for inputting information including coordinate data that include extracting a predetermined object from an image including the predetermined object above a plane, detecting a motion of the predetermined object while the predetermined object is in a predetermined distance from the plane, and determining to input predetermined information.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
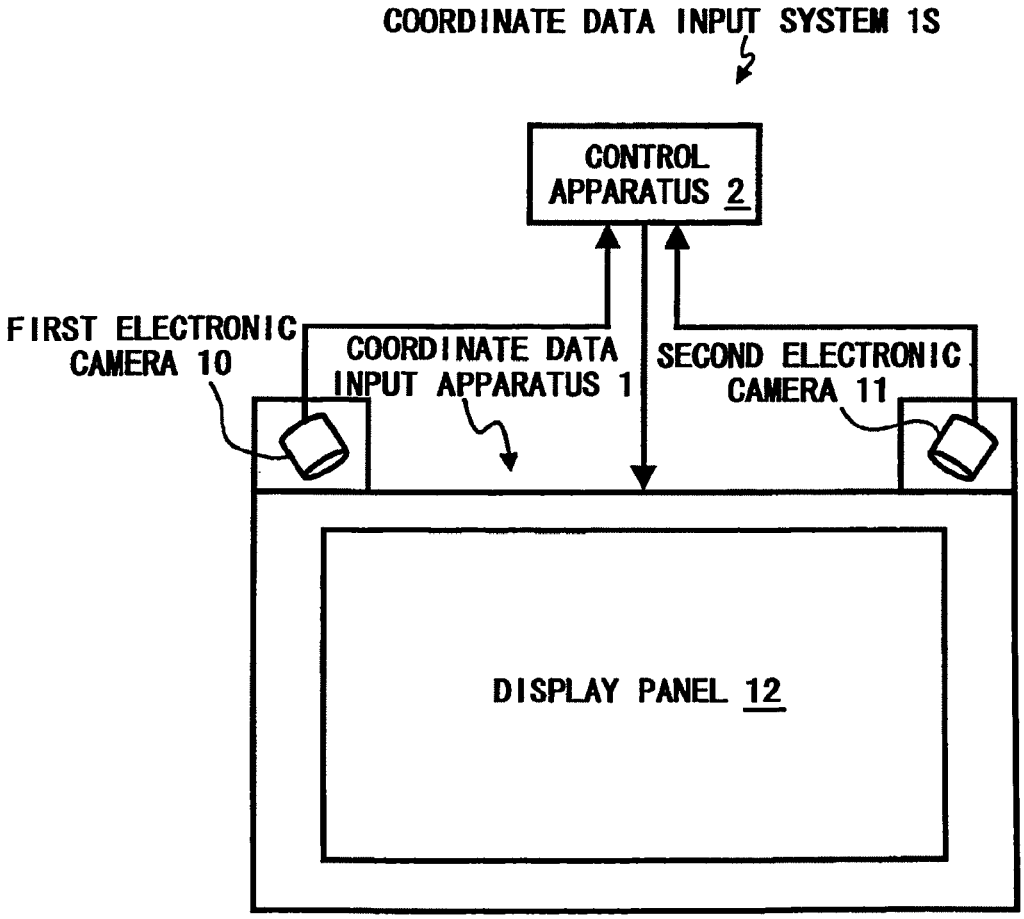
FIG. 1 is a schematic view illustrating a coordinate data input system as an example configured according to the present invention.

Referring now to the drawings, wherein like reference numerals designate identical or corresponding parts throughout the several views, and more particularly to FIG. 1 thereof, is a schematic view illustrating a coordinate data input system 1S as an example configured according to the present invention. The coordinate data input system 1S includes a coordinate data input apparatus 1 and a control apparatus 2. The coordinate data input apparatus 1 includes a first electronic camera 10, a second electronic camera 11, and a display panel 12.

The display panel 12 displays an image with, for example, a 48 by 36 inch screen (diagonally 60 inches) and 1024 by 768-pixel resolution, which is referred as an XGA screen. For example, a plasma display panel, a rear projection display, etc., may be used as the display panel 12. Each of the first electronic camera 10 and the second electronic camera 11 implements a two-dimensional imaging device with a resolution that enables such as a selecting operation of an item in a menu window, a drawing operation of free hand lines, letters, etc. A two-dimensional imaging device is also referred as an area sensor.

The two-dimensional imaging device preferably has variable output frame rate capability. The two-dimensional imaging device also preferably has a random access capability that allows any imaging cell therein randomly accessed to obtain an image signal from the cell. Such a random access capability is sometimes also referred to as random addressability. As an example of such a random access two-dimensional imaging device, a complementary metal oxide semiconductor sensor (CMOS sensor) may be utilized.

The electronic camera 10 also includes a wide-angle lens 50 which covers around 90 degrees or wider angle and an analog to digital converter. Likewise, the electronic camera 11 also includes a wide-angle lens 52 which covers around 90 degrees or wider angle and an analog to digital converter. The first electronic camera 10 is disposed at a upper corner of the display panel 12 and such that an optical axis of the wide-angle lens 50 forms an angle of approximately 45 degrees with the horizontal edge of the display panel 12. The second electronic camera 11 is disposed at the other upper corner of the display panel 12 and such that the optical axis of the wide-angle lens 52 forms an angle of approximately 45 degrees with the horizontal edge of the display panel 12.

Further, the optical axis each of the electronic cameras 10 and 11 is disposed approximately parallel to a display screen surface of the display panel 12. Thus, the electronic cameras 10 and 11 can capture whole the display screen surface of the display panel 12, respectively. Each of the captured images is converted into digital data, and the digital image data is then transmitted to the control apparatus 2.

Figure 2:
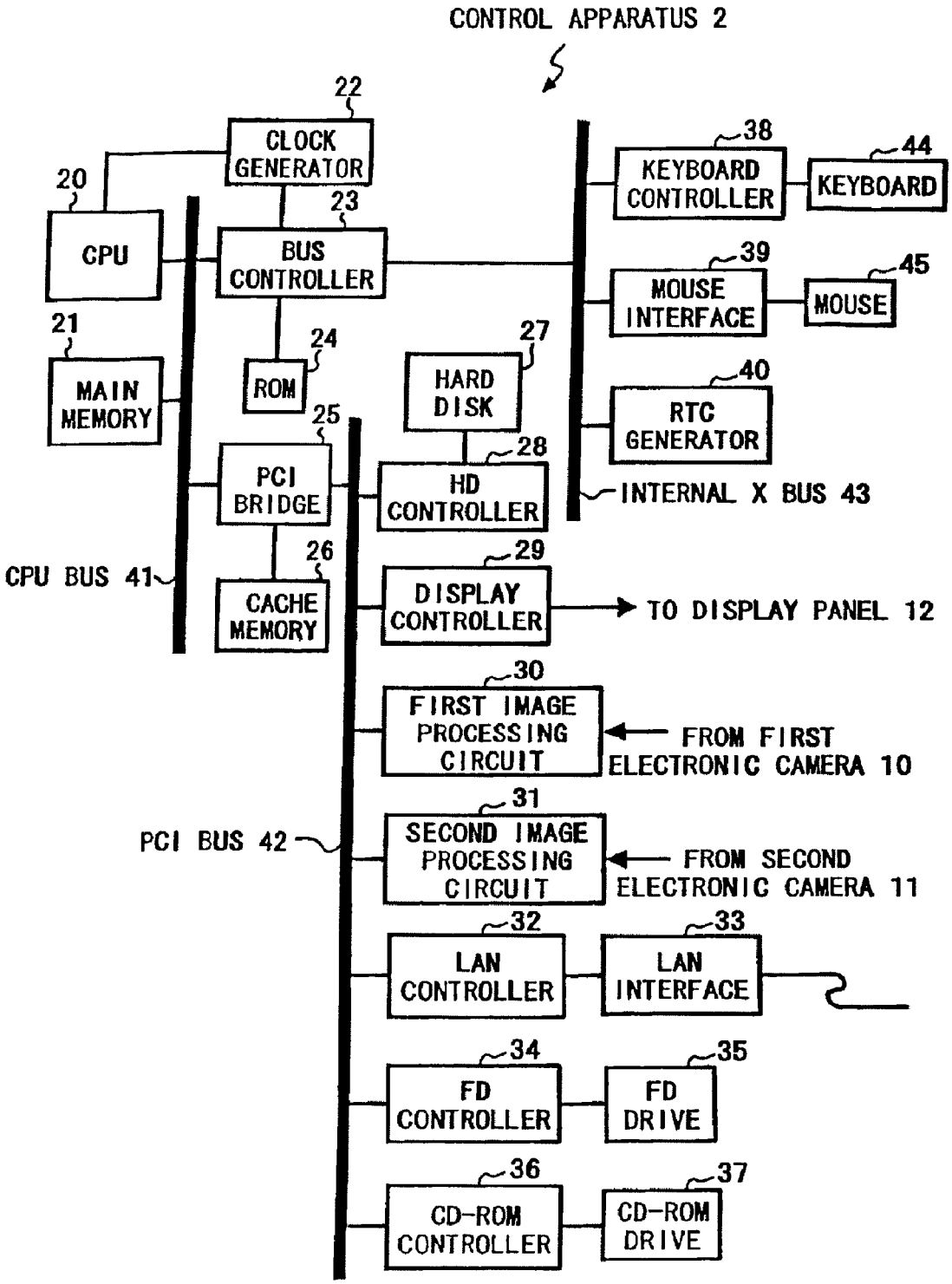
FIG. 2 is an exemplary block diagram of a control apparatus of the coordinate data input system of FIG. 1.

FIG. 2 is an exemplary block diagram of the control apparatus 2 of the coordinate data input system 1S of FIG. 1. Referring to FIG. 2, the control apparatus 2 includes a central processing unit (CPU) 20, a main memory 21, a clock generator 22, a bus controller 23, a read only memory (ROM) 24, a peripheral component interconnect (PCI) bridge 25, a cash memory 26, a hard disk 27, a hard disk controller (HD controller) 28, a display controller 29, a first image processing circuit 30, and a second image processing circuit 31.

The control apparatus 2 also includes a local area network controller (LAN controller) 32, a LAN interface 33, a floppy disk controller (FD controller) 34, a FD drive 35, a compact disc read only memory controller (CD-ROM controller) 36, a CD-ROM drive 37, a keyboard controller 38, a mouse interface 39, a real time clock generator (RTC generator) 40, a CPU bus 41, a PCI bus 42, an internal X bus 43, a keyboard 44, and a mouse 45.

The CPU 20 executes a boot program, a basic input and output control system (BIOS) program stored in the ROM 24, an operating system (OS), application programs, etc. The main memory 21 may be structured by, e.g., a dynamic random access memory (DRAM), and is utilized as a work memory for the CPU 20. The clock generator 22 may be structured by, for example, a crystal oscillator and a frequency divider, and supplies a generated clock signal to the CPU 20, the bus controller 23, etc., to operate those devices at the clock speed.

The bus controller 23 controls data transmission between the CPU bus 41 and the internal X bus 43. The ROM 24 stores a boot program, which is executed immediate after the coordinate data input system 1S is turned on, device control programs for controlling the devices included in the system 1S, etc. The PCI bridge 25 is disposed between the CPU bus 41 and the PCI bus 42 and transmits data between the PCI bus 42 and devices connected to the CPU bus 41, such as the CPU 20 through the use of the cash memory 26. The cash memory 26 may be configured by, for example, a DRAM.

The hard disk 27 stores system software such as an operating system, a plurality of application programs, various data for multiple users of the coordinate data input system 1S. The hard disk (HD) controller 28 implements a standard interface, such as a integrated device electronics interface (IDE interface), and transmits data between the PCI bus 42 and the hard disk 27 at a relatively high speed data transmission rate.

The display controller 29 converts digital letter/character data and graphic data into an analog video signal, and controls the display panel 12 of the coordinate data input apparatus 1 so as to display an image of the letters/characters and graphics thereon according to the analog video signal.

The first image processing circuit 30 receives digital image data output from the first electronic camera 10 through a digital interface, such as an RS-422 interface. The first image processing circuit 30 then executes an object extraction process, an object shape recognition process, a motion vector detection process, etc. Further, the first image processing circuit 30 supplies the first electronic camera 10 with a clock signal and an image transfer pulse via the above-described digital interface.

Similarly, the second image processing circuit 31 receives digital image data output from the second electronic camera 11 through a digital interface, such as also an RS-422 interface. The second image processing circuit 31 is configured as the substantially same hardware as the first image processing circuit 30, and operates substantially the same as the first image processing circuit 30 operates. That is, the second image processing circuit 31 also executes an object extraction process, an object shape recognition process, a motion vector detection process, and supplies a clock signal and an image transfer pulse to the second electronic camera 11 as well.

In addition, the clock signal and the image transfer pulse supplied to the first electronic camera 10 and those signals supplied to the second electronic camera 11 are maintained in synchronization.

The LAN controller 32 controls communications between the control apparatus 2 and external devices connected to a local area network, such as an Ethernet, via the LAN interface 33 according to the protocol of the network. As an example of an interface protocol, the Institute of Electrical and Electronics Engineers (IEEE) 802.3 standard may is used.

The FD controller 34 transmits data between the PCI bus 42 and the FD drive 35. The FD drive 35 reads and writes a floppy disk therein. The CD-ROM controller 36 transmits data between the PCI bus 42 and the CD-ROM drive 37. The CD-ROM drive 37 reads a CD-ROM disc therein and sends the read data to the CD-ROM controller 36. The CD-ROM controller 36 and the CD-ROM drive 37 may be connected with an IDE interface.

The keyboard controller 38 converts serial key input signals generated at the keyboard 44 into parallel data. The mouse interface 39 is provided with a mouse port to be connected with the mouse 45 and controlled by mouse driver software or a mouse control program. In this example, the coordinate data input apparatus 1 functions as a data input device, and therefore the keyboard 44 and the mouse 45 may be omitted from the coordinate data input system 1S in normal operations except for a moment during a maintenance operation for the coordinate data input system 1S. The RTC generator 40 generates and supplies calendar data, such as day, hour, and minute, etc., and is battery back-upped.

Figure 3:
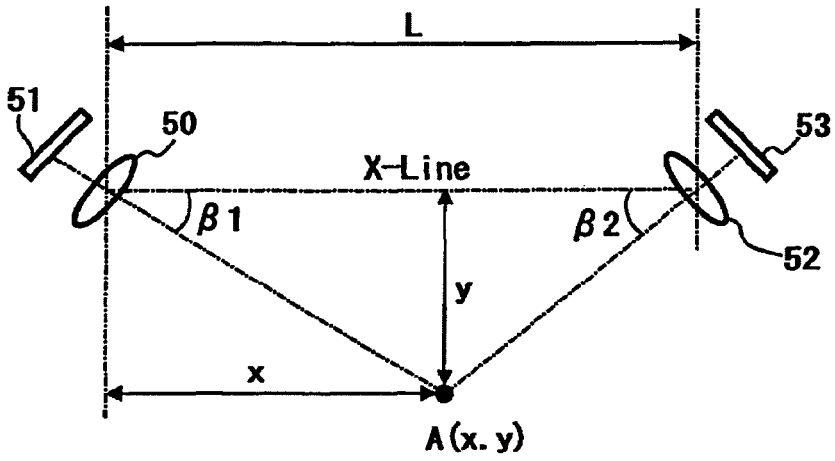
FIG. 3 is a diagram illustrating a method for obtaining coordinates where a coordinate input member contacts a display panel.

Now, a method for determining a location where a coordinate input member has touched on or come close to the image display surface of the display panel 12 is described. FIG. 3 is a diagram illustrating a method for obtaining coordinates where a coordinate input member contacts or comes close to the display panel 12. Referring to FIG. 3, the first electronic camera 10 includes the wide-angle lens 50 and a CMOS image sensor 51, and the second electronic camera 11 also includes the wide-angle lens 52 and a CMOS image sensor 53.

As stated above, the first and second electronic cameras 10 and 11 are disposed such that the optical axes of the wide-angle lenses 50 and 52, i.e., the optical axes of incident lights to the cameras, are parallel to the display surface of the display panel 12. Further, the first and second electronic cameras 10 and 11 are disposed such that each of the angles of view of the electronic cameras 10 and 11 covers substantially a whole area where the coordinate input member can come close and touch the display panel 12.

In FIG. 3, the symbol L denotes a distance between the wide-angle lens 50 and the wide-angle lens 52, and the symbol X-Line denotes a line connecting the wide-angle lens 50 and the wide-angle lens 52. The symbol A(x, y) denotes a point A where a coordinate input member comes close to or touches the display panel 12 and the coordinates (x, y) thereof. The point A(x, y) is referred as a contacting point. Further, the symbol (β1 denotes an angle which the line X-line forms with a line connecting the wide-angle lens 50 and the contacting point A(x, y), and the symbol β2 denotes an angle that the X-line forms with a line connecting the wide-angle lens 52 and the contacting point A(x, y).

Figure 4:
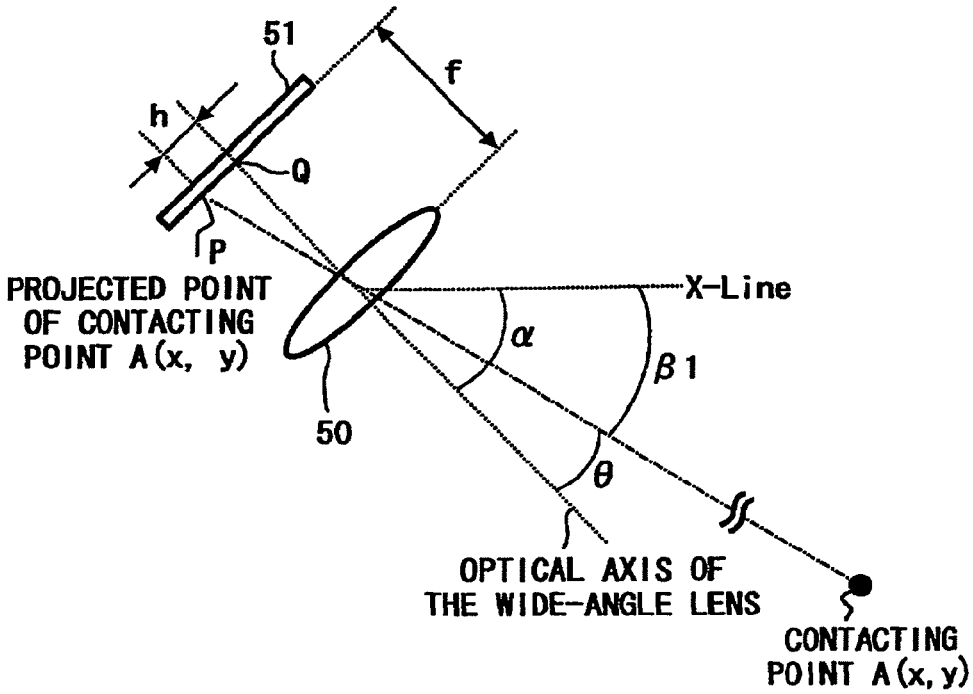
FIG. 4 is a magnified view of the wide-angle lens and the CMOS image sensor of FIG. 3.

FIG. 4 is a magnified view of the wide-angle lens 50 and the CMOS image sensor 51 of FIG. 3. Referring to FIG. 4, the symbol f denotes a distance between the wide-angle lens 50 and the CMOS image sensor 51. The symbol Q denotes a point at which the optical axis of the wide-angle lens 50 intersects the CMOS image sensor 51. The point Q is referred as an optical axis crossing point.

The symbol P denotes a point where an image of the contacting point A(x, y) is formed on the CMOS image sensor 51. The point P is referred as a projected point P of the contacting point A(x, y). The symbol h denotes a distance between the point P and the point Q. The symbol a denotes an angle which the optical axis of the wide-angle lens 50 forms with the X-line, and the symbol θ denotes an angle which the optical axis of the wide-angle lens 50 forms with a line connecting the contacting point A(x, y) and the point P.

Referring to FIG. 3 and FIG. 4, the following equations hold;

$$\theta=\arctan(h/f) \quad (1)$$

$$\beta 1-\alpha-\theta \quad (2)$$

Where, the angle $\alpha$ and the distance f are constant values, because these values are determined by a mounted mutual location of the wide-angle lens 50 and the CMOS image sensor 51, and a mounted angle of the wide-angle lens 50 to the line X-line at a manufacturing plant. Therefore, when the distance h is given, the angle $\beta 1$ is solved. Regarding the second electronic camera 11, similar equations are hold, and thus the angle $\beta 2$ is solved.

After the angle $\beta 1$ and the angle $\beta 2$ are obtained, the coordinates of the contacting point A(x, y) are calculated by the followings based on a principle of trigonometrical survey;

$$x=Lx \tan \beta 2/(\tan \beta 1+\tan \beta 2) \quad (3)$$

$$y=x \times \tan \beta 1 \quad (4)$$

Next, a relation between the CMOS image sensor 51 and an image of the edges of the display panel 12 formed on the CMOS image sensor 51 is described. Each of the CMOS image sensors 51 and 53 has a two-dimensional array or a matrix of imaging picture elements (pixels) or imaging cells. When the number of imaging cells in a direction and the number of imaging cells in the other direction are different each other, the CMOS image sensors 51 and 53 are disposed such that a side having the larger number of imaging cells is parallel to the surface of the display panel 12.

Regarding the CMOS image sensors 51 and 53, a coordinate axis along the direction having the larger number of imaging cells is represented by Ycamera axis. A coordinate axis along the direction having a smaller number of imaging cells, i.e., the direction perpendicular to the Ycamera axis is represented by Xcamera axis. Thus, images of the edges or margins of the display panel 12 that are formed on the CMOS image sensors 51 and 53 become a line parallel to the Ycamera axis and perpendicular to the Xcamera axis. A projection of the surface of the display panel 12 on the CMOS image sensors 51 and 53 is formed as substantially the same line on the CMOS image sensors 51 and 53. Accordingly, such a line formed on the CMOS image sensors 51 and 53 is hereinafter referred as "a formed line of the surface of the display panel 12," "a projected line of the surface of the display panel 12," or just simply "the surface of the display panel 12."

Figure 5:
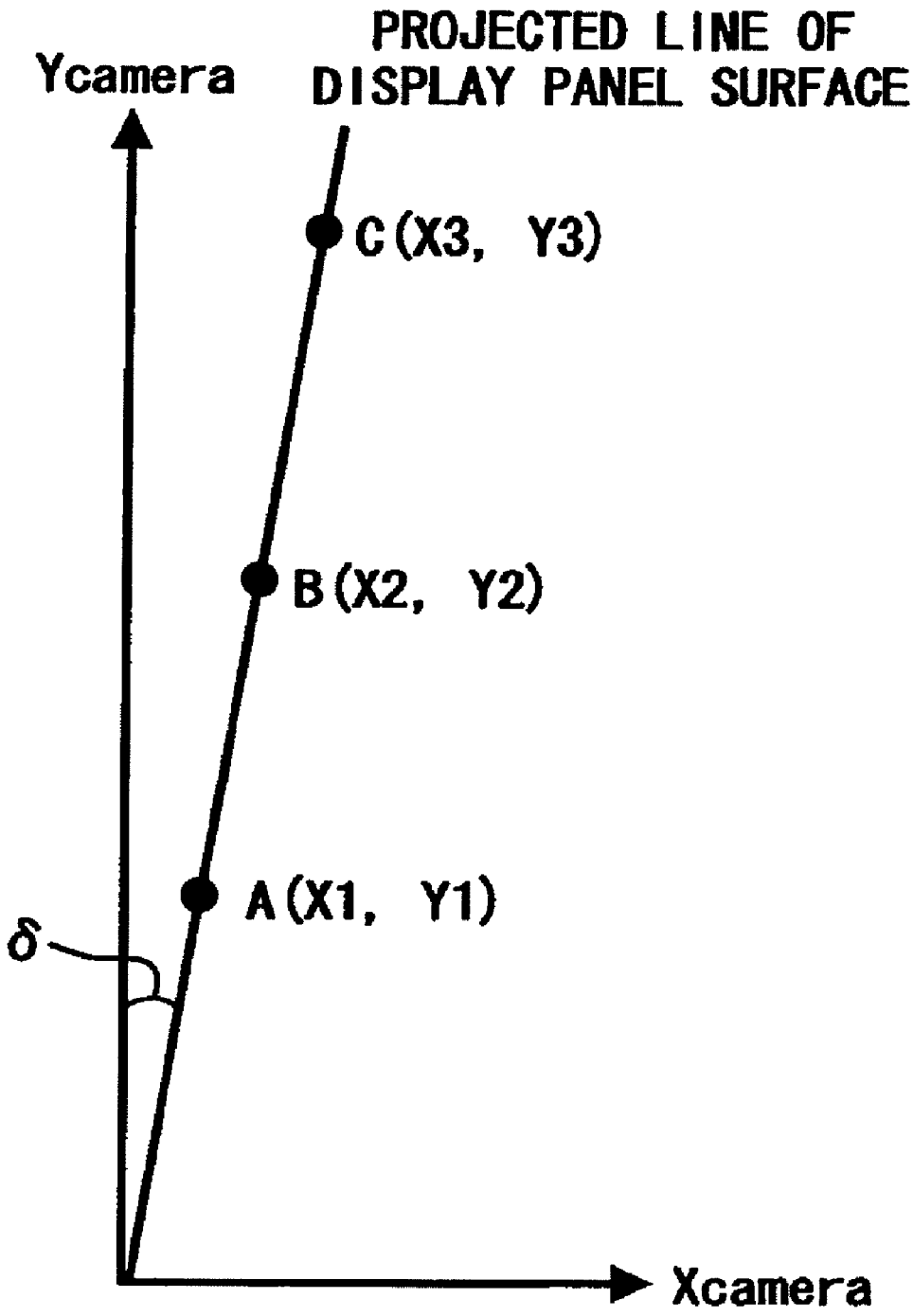
FIG. 5 is a diagram illustrating a tilt of the surface of the display panel to the CMOS image sensor.

FIG. 5 is a diagram illustrating a tilt of the surface of the display panel 12 to the CMOS image sensors 51 and 53. Referring to FIG. 5, when the surface of the display panel 12 is not parallel, i.e., is tilted to the Ycamera axis as illustrated, the tilting angle $\delta$ to the Ycamera axis is obtained as follows.

When, points A(x1c, y1c), B(x2c, y2c), C(x3c, y3c) are arbitrary points on the projected line of the surface of the display panel 12. An angle $\delta$ between a line connecting each point and the origin of the coordinate system and the Ycamera axis is stated as follows;

$$\delta 1=\arctan(x1c/y1c) \quad (5)$$

$$\delta 2=\arctan(x2c/y2c) \quad (6)$$

$$\delta 3=\arctan(x3c/y3c) \quad (7)$$

After that, the tilted angle $\delta$ is obtained as an average value of those angles;

$$\delta=(\delta 1+\delta 2+\delta 3)/3 \quad (8)$$

When the surface of the display panel 12 is tilted to the Ycamera axis, a tilted coordinate system, which tilts angle $\delta$ to the original coordinate system (Xcamera, Ycamera), may also be conveniently utilized to obtain a location of a coordinate input member and a motion vector thereof. The tilted coordinate system is related to a rotation of the original coordinate system at angle $\delta$. When the surface of the display panel 12 tilts clockwise, the tilted coordinate system is obtained by being rotated counterclockwise, and vice versa. Relations between the original coordinate system (Xcamera, Ycamera) and the tilted coordinate system, which is denoted by (X1camera, Y1camera), are the following:

$$X1camera=XcameraX \cos \delta+YcameraX \sin \delta \quad (9)$$

$$Y1camera=XcameraX \cos \delta-YcameraX \sin \delta \quad (10)$$

When the surface of the display panel 12 does not tilt to the Ycamera axis by, e.g., as a result of adjusting operation on the electronic cameras 10 and 11 at a production factory, or an installing and maintenance operation at a customer office, those coordinate conversions are not always needed.

Figure 6:
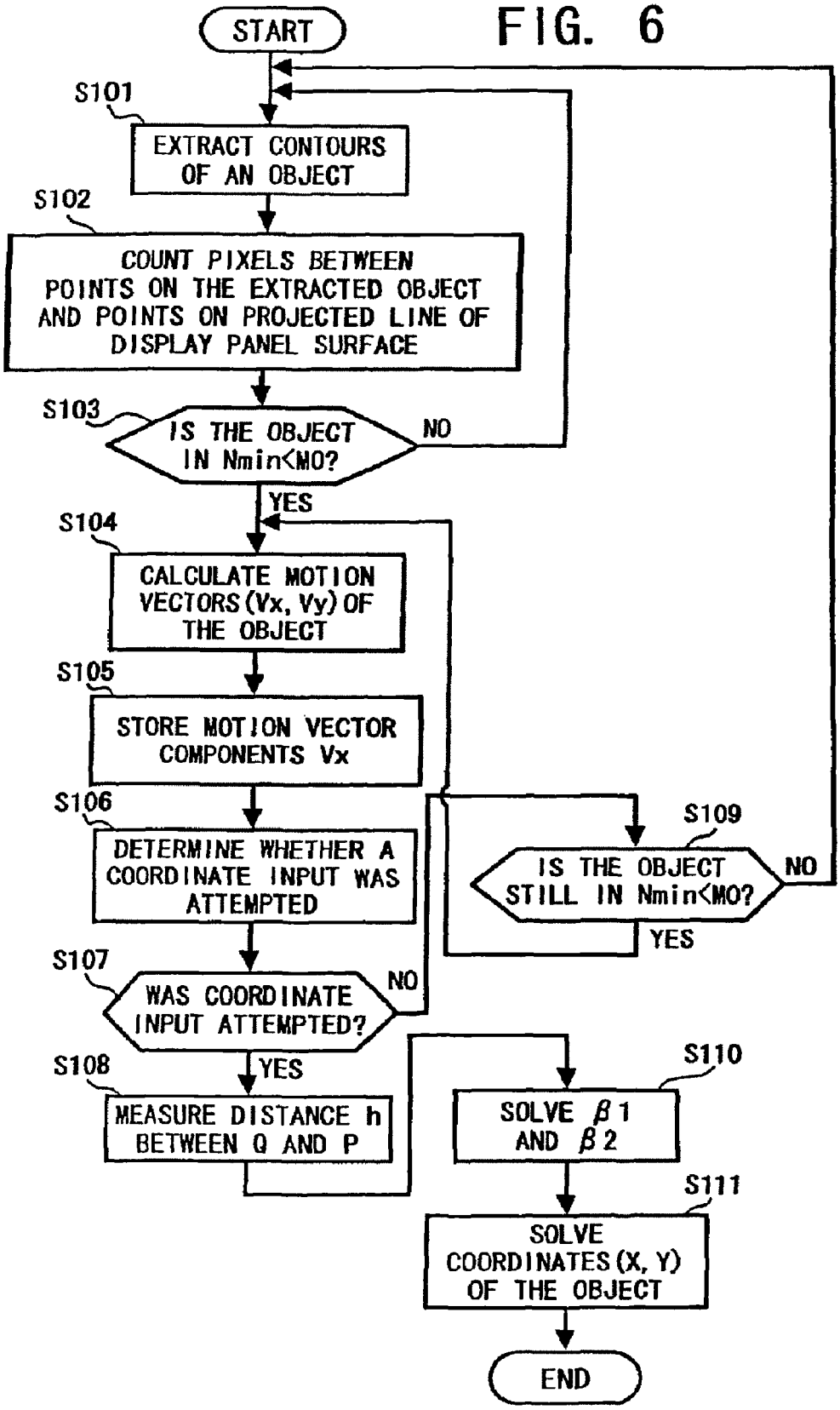
FIG. 6 is a flowchart illustrating operational steps for practicing a coordinate data inputting operation in the coordinate data input system of FIG. 1 as an example configured according to the present invention.

FIG. 6 is a flowchart illustrating operational steps for practicing a coordinate data inputting operation in the coordinate data input system 1S of FIG. 1 as an example configured according to the present invention. By the way, the CMOS image sensor 51 may not always have an appropriate image aspect ratio, or a ratio of the number of imaging cells in a direction to that in the other direction. In such a case, the first electronic camera 10 allows outputting the image signal captured by the CMOS image sensor 51 within a predetermined range from the surface of the display panel 12 in a direction perpendicular to the surface. In other words, the first electronic camera 10 outputs digital image data in the predetermined range to the first image processing circuit 30 in the control apparatus 2. Likewise, the second electronic camera 11 outputs digital image data in a predetermined range to the second image processing circuit 31.

With reference to FIG. 6, in step 5101, the first image processing circuit 30 extracts contours of an object as a coordinate input member from frame image data received from the first electronic camera 10. As an example of extraction methods of contours of an object, the first image processing circuit 30 first determines gradients of image density among the pixels by differentiation, and then extracts contours based on a direction and magnitude of the gradients of image density. Further, the method described in Japanese Patent Publication No. 8-16931 may also be applied for extracting an object as a coordinate input member from frame image data.

In step 5102, the first image processing circuit 30 measures plural distances between the object and the projected line of the surface of the display panel 12 on the CMOS image sensor 51. For measuring a distance, the first image processing circuit 30 counts pixels included between a point on the contours of the extracted object and a point on the projected line of the surface of the display panel 12 on the CMOS image sensor 51. An image forming reduction ratio on the CMOS image sensor 51 is fixed and a pixel pitch of the CMOS image sensor 51 (i.e., the interval between imaging cells) is known. As a result, the number of pixels between two points determines a distance between the two points.

For measuring plural distances between the object and the surface of the display panel 12, the first image processing circuit 30 counts pixels as regards plural distances between the contours of the extracted object and the projected line of the surface of the display panel 12.

In step S103, the first image processing circuit 30 extracts the least number of pixels among the plural numbers of pixels counted for measuring plural distances in step S102. A symbol Nmin denotes the least number of pixels among the plural numbers of pixels. Consequently, the distance being the minimum value Nmin corresponds to a nearest point of the object to the surface of the display panel 12. The first image processing circuit 30 then determines whether the minimum value Nmin is smaller than a predetermined number M0. When the minimum value Nmin is smaller than the predetermined number M0, i.e., YES in step S103, the process proceeds to step S104, and when the minimum value Nmin is not smaller than the predetermined number M0, i.e., NO in step S103, the process returns to step S101.

In step S104, the first image processing circuit 30 calculates motion vectors regarding predetermined plural points on the extracted contours of the object including the nearest point to the display panel 12. For this calculation, the first image processing circuit 30 uses the identical frame image data used for extracting the contours and the next following frame image data received from the first electronic camera 10.

In this example, the first image processing circuit 30 obtains optical flows, i.e., velocity vectors, by calculating a rate of temporal change of a pixel image density. The first image processing circuit 30 also obtains a rate of spatial change of image densities of pixels in the vicinity of the pixel used for calculating the rate of temporal change of the pixel image density. The motion vectors are expressed on the coordinate system (Xcamera, Ycamera), which associates with the projected line of the surface of the display panel 12 on the CMOS image sensor 51 (i.e., Ycamera) and the coordinate perpendicular to the surface of the display panel 12 (i.e., Xcamera).

Figure 7:
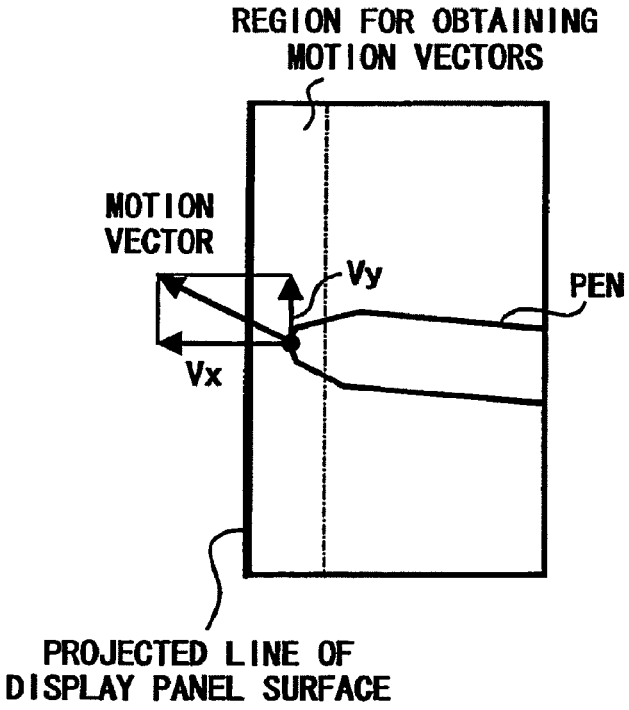
FIG. 7 is a diagram illustrating an image captured by the first electronic camera of FIG. 1.

FIG. 7 is a diagram illustrating an image captured by the first electronic camera 10. With Reference to FIG. 7, a thick line illustrates the projected line of the surface of the display panel 12 on the CMOS image sensors 51. The display panel 12 includes a display area and a frame in circumference of and at approximately same level of the display screen surface. Therefore, the surface of the display panel 12 can also be the surface of the frame. The alternate long and short dash line is drawn at a predetermined distance from the projected line of the surface of the display panel 12. The predetermined distance corresponds to the predetermined number M0 of pixels at the step S103 of FIG. 6, and the region limited by the predetermined distance is denoted by REGION FOR OBTAINING MOTION VECTORS. The linked plural lines illustrate a pen as the extracted contours of the object at the step S101 of FIG. 6.

In this example, the nearest point of the pen to the display panel 12, which is marked by the black dot at the tip of the pen in FIG. 7, is in the REGION FOR OBTAINING MOTION VECTORS. Accordingly, a calculation of motion vectors, which is executed at the step S104 of FIG. 6, results in such as the motion vector and components thereof. Vx and Vy as illustrated in FIG. 7 regarding the nearest point (black dot) of the pen.

Referring back to FIG. 6, in step S105, the CPU 20 stores motion vector components along the direction Xcamera of the calculated vectors, such as the component Vx illustrated in FIG. 7, in the main memory 21. The CPU 20 stores those vector components from each obtained frame image data in succession. The successively stored motion vector data is also referred as trace data.

In step S106, the CPU 20 determines whether the extracted object, such as the pen in FIG. 7, has made an attempt to input coordinates on the display panel 12 based on the trace data of motion vectors. A determining method is further described later. When the extracted object has made an attempt to input coordinates, i.e., YES in step S107, the process proceeds to step S108, and when the object has not made an attempt to input coordinates, i.e., No in step S107, the process branches to step S109.

In step S108, the CPU 20 measures the distance h between the optical axis crossing point Q and a projected point P of a contacting point A(x, y) of the object. When the extracted object is physically soft, such as a human finger, the extracted object may contact at an area rather than a point. In such case, the contacting point A(x, y) can be replaced with the center of the contacting area. In addition, as stated earlier, the term contacting point A(x, y) is applied for not only a contacting state of the object and the display panel 12, but also a state that the object is adjacent to the display panel 12.

A range from the optical axis crossing point Q to an end of the CMOS image sensor 51 contains a fixed number (denoted by N1) of pixels, which only depends upon relative locations of the wide-angle lens 50 and the CMOS image sensor 51 being disposed.

On the other hand, a range from the point P to the end of the CMOS image sensor 51 contains variable pixels (denoted by N2), which varies depending upon the location of the contacting point A(x, y) of the object. Therefore, the range between the point Q and the point P contains |N1-N2| pixels, and the distance between the point Q and point P in the direction Ycamera, i.e., the distance h, is determined as |N1-N2| x the pitch of the pixels.

Referring back again to FIG. 6, in step S110, the CPU 20 solves the angle β1 by using the equations (1) and (2), with known quantities f and α, and the measured distance h. As regards image data received from the second electronic camera 11, the CPU 20 solves the angle β2 in a similar manner.

In step S111, the CPU 20 solves the coordinates x and y of the object on the display panel 12 by using the equations (3) and (4), with known quantities L, and the solved angles β1 and β2.

In step S109, the CPU 20 determines whether the object is still within the predetermined region above the display panel 12 using the trace data of motion vector components Vx of the object. When the object is in the predetermined region, i.e., YES in step S109, the process returns to step S104 to obtain motion vectors again, and when the object is out of the predetermined region, i.e., NO in step S109, the process returns to step S101.

As stated above, for solving β1, β2, x and y by using equations (1), (2), (3) and (4), the calculating operations is executed by the CPU 20. However, angles β1, β2 may also be solved by the first image processing circuit 30 and the second image processing circuit 31, respectively, and then the obtained β1, β2 are transferred to the CPU 20 to solve the coordinates x and y.

In addition, the CPU 20 may also execute the above-described contour extracting operation in step S101, the distance measuring operation in step S102, the least number extracting and comparing operation in steps S103 and S104 in place of the first image processing circuit 30. When the CPU 20 executes the operation, the hard disk 27 may initially store program codes, and the program codes are loaded to the main memory 21 for execution every time after the system 1S is boot upped.

When the coordinate data input system 1S is in a writing input mode or a drawing input mode, the CPU 20 generates display data according to the obtained plural sets of coordinates x and y of the object, i.e., the locus data of the object, and sends the generated display data to the display controller 29. Thus, the display controller 29 displays an image corresponding to the locus of the object on the display panel 12 of the coordinate data input apparatus 1.

Figure 8:
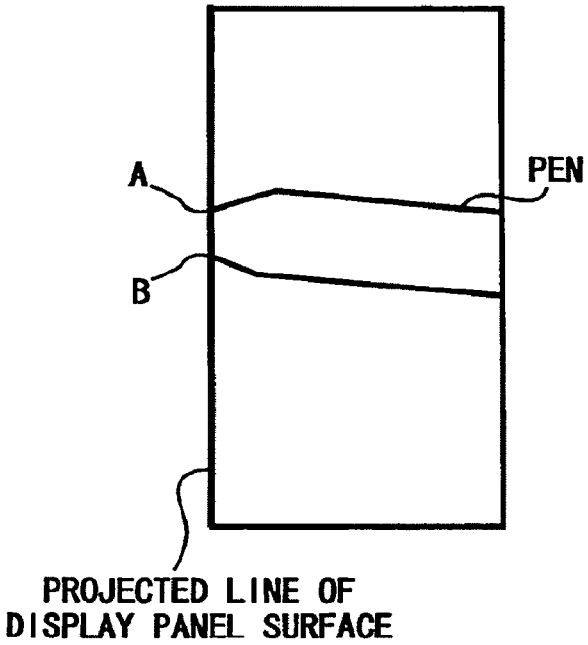
FIG. 8 is a diagram illustrating an image captured by the first electronic camera when an input pen distorts the surface of a display panel.

A certain type of display panel, such as a rear projection display, has a relatively elastic surface, such as a plastic sheet screen. FIG. 8 is a diagram illustrating an image captured by the first electronic camera 10 when an input pen distorts the surface of a display panel. In the captured image, the tip of the pen is out of the frame due to the distortion or warp in the surface of the display panel caused by the pressure of the pen stroke. Intersections of the surface of the display panel 12 and the contours of the pen are denoted by point A and point B.

Accordingly, when the method of FIG. 6 is applied for a display panel having such a relatively elastic surface, the middle point of the points A and B may be presumed or substantially equivalent to a nearest point of the pen as well as a literal sense of the nearest point, such as the black dot at the tip of the pen illustrated in FIG. 7.

Figure 9:
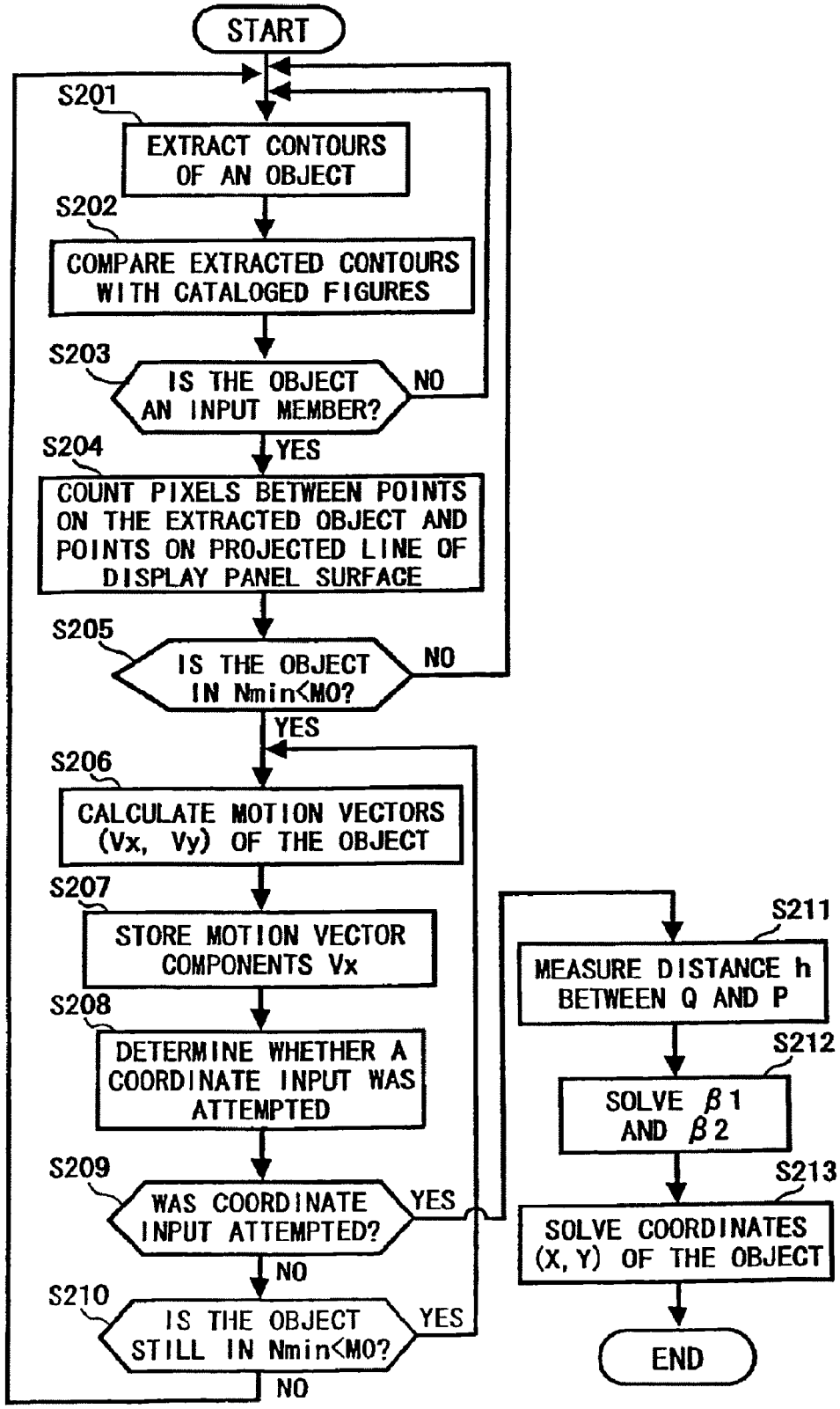
FIG. 9 is a flowchart illustrating operational steps for practicing a coordinate data inputting operation as another example configured according to the present invention.

FIG. 9 is a flowchart illustrating operational steps for practicing a coordinate data inputting operation as another example configured according to the present invention. The method is also executed on the coordinate data input system 1S of FIG. 1.

With reference to FIG. 9, in step S201, the first image processing circuit 30 or the CPU 20 extracts contours of an object as a coordinate input member from frame image data received from the first electronic camera 10.

In step S202, the first image processing circuit 30 or the CPU 20 first extracts geometrical features of the shape of the extracted contours of the object. For extracting geometrical features, the first image processing circuit 30 or the CPU 20 determines the position of the barycenter of the contours of the object, then measures distances from the barycenter to plural points on the extracted contours for all radial directions like the spokes of a wheel. Then, the CPU 20 extracts geometrical features of the contour shape of the object based on relations between each direction and the respective distance. Japanese Laid-Open Patent Publication No. 8-315152 may also be referred for executing the above-stated character extraction method.

After that, the CPU 20 compares the extracted geometrical features of the contour shape of the object with features of cataloged shapes of potential coordinate input members one after the other. The shapes of potential coordinate input members may be stored in the ROM 24 or the hard disk 27 in advance.

When the operator of the coordinate data input system 1S points to an item on a menu or an icon, or draws a line, etc., with a coordinate input member, the axis of the coordinate input member may tilt in any direction with various tilting angles. Therefore, the CPU 20 may rotate the contour shape of the object for predetermined angles to compare with the cataloged shapes.

Figure 10:
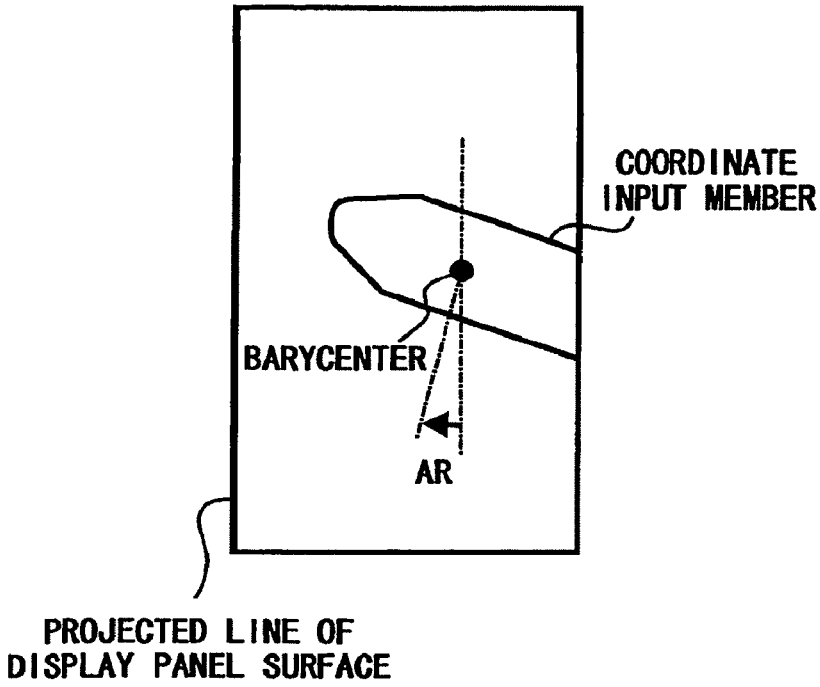
FIG. 10 is a diagram illustrating an image captured by the first electronic camera when an input pen tilts to the surface of a display panel.

FIG. 10 is a diagram illustrating an image captured by the first electronic camera 10 when an input pen as a coordinate input member tilts to the surface of a display panel 12. In this case, the pen tilts to the surface of the display panel 12 at an angle AR as illustrated. Therefore, when the CPU 20 inversely rotates, i.e., rotates counterclockwise, the contour shape of the object at the angle AR, the contour shape easily coincides with one of the cataloged shapes.

Instead of such a rotating operation of the contour shape, the shapes of potential coordinate input members may be rotated at plural angles in advance, and the rotated shapes stored in the ROM 24 or the hard disk 27. Thus, the real-time rotating operation of the contour shape is not needed; consequently, execution time for the coordinate data inputting operation is further saved.

Figure 11:
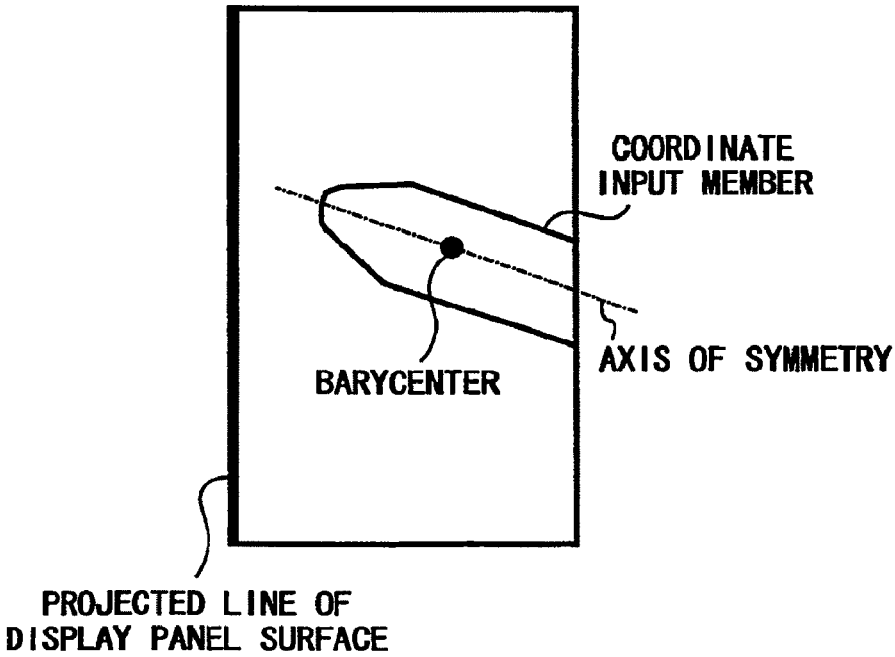
FIG. 11 is a diagram illustrating an image having an axial symmetry pen captured by the first electronic camera.

FIG. 11 is a diagram illustrating an image having an axially symmetric pen captured by the first electronic camera 10. As in the illustrated example, various sorts of potential coordinate input members, such as a pen, a magic marker, a stick, a rod, etc., have axial symmetry. Therefore, the CPU 20 may analyze whether the captured object has axial symmetry, and when the captured object has axial to symmetry, the CPU 20 can simply presume the captured object to be a coordinate input member.

By this method, not all the cataloged shapes of potential coordinate input members are required to be stored in the ROM 24 or the hard disk 27; therefore storage capacity thereof is saved. As an example, the axial symmetry may be determined based on distances from the barycenter to plural points on the extracted contours.

Referring back to FIG. 9, in step S203, the CPU 20 determines whether the character extracted contour shape of the object coincides with one of the cataloged shapes of potential coordinate input members by determining methods including the above-stated methods. When the character extracted contour shape coincides with one of the cataloged shapes, i.e., YES in step S203, the process proceeds to step S204, and when the contour shape does not coincide with any of the cataloged shapes, i.e., NO in step S203, the process returns to step S201.

In step S204, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 with respect to each of the plural distances. A distance between two points is obtained as the product of the pixel pitch of the CMOS image sensor 51 and the number of pixels between the points.

In step S205, the first image processing circuit 30 or the CPU 20 extracts the least number of pixels, which is denoted by Nmin, among the plural numbers of pixels counted in step S204, and determines whether the minimum value Nmin is smaller than a predetermined number M0. When the minimum value Nmin is smaller than the predetermined number M0, i.e., YES in step S205, the process proceeds to step S206, and when the minimum value Nmin is not smaller than the predetermined number M0, i.e., NO in step S205, the process returns to step S201.

In step S206, the first image processing circuit 30 or the CPU 20 calculates motion vectors (Vx, Vy) regarding predetermined plural points on the extracted contours of the object including the nearest point to the display panel 12. The component Vx is a vector component along the Xcamera axis, i.e., a direction perpendicular to the projected line of the surface of the display panel 12, and the component Vy is a vector component along the Ycamera axis, i.e., a direction along the surface of the display panel 12. For calculating the motion vectors, the first image processing circuit 30 or the CPU 20 uses consecutive two frames and utilizes the optical flow method stated above.

In step S207, the CPU 20 successively stores motion vector components along the direction of Xcamera (i.e., Vx) of the calculated motion vectors of frames in the main memory 21 as trace data. In step S208, the CPU 20 determines whether the extracted object has made an attempt to input coordinates on the display panel 12 based on the trace data of motion vectors. When the object has made an attempt to input coordinates, i.e., YES in step S209, the process branches to step S211, and when the object has not made an attempt, i.e., No in step S209, the process proceeds to step S210.

In step S210, the CPU 20 determines whether the object is within a predetermined region above the display panel 12 using the trace data of motion vector components Vx of the object. When the object is in the predetermined region, i.e., YES in step S210, the process returns to step S206 to obtain new motion vectors again, and when the object is out of the predetermined region, i.e., NO in step S210, the process returns to step S201.

In step S211, the first image processing circuit 30 or the CPU 20 measures a distance h on the CMOS image sensor 51 between the optical axis crossing point Q and a projected point P of a contacting point A(x, y). In step S212, with reference to FIG. 4, the CPU 20 solves the angle β1 by using the equations (1) and (2), with known quantities f and α, and the measured distance h. As regards image data received from the second electronic camera 11, the CPU 20 solves the angle α2 in a similar manner.

In step S213, referring to FIG. 3, the CPU 20 solves the coordinates x and y of the object on the display panel 12 by using the equations (3) and (4), with known quantities L, and the solved angles β1 and β2.

As described, the CPU 20 only inputs coordinates of an object that coincides with one of cataloged shapes of potential coordinate input members. Accordingly, the coordinate data input system 1S can prevent an erroneous or unintentional inputting operation, e.g., inputting coordinates of an operator's arm, head, etc.

Figure 12:
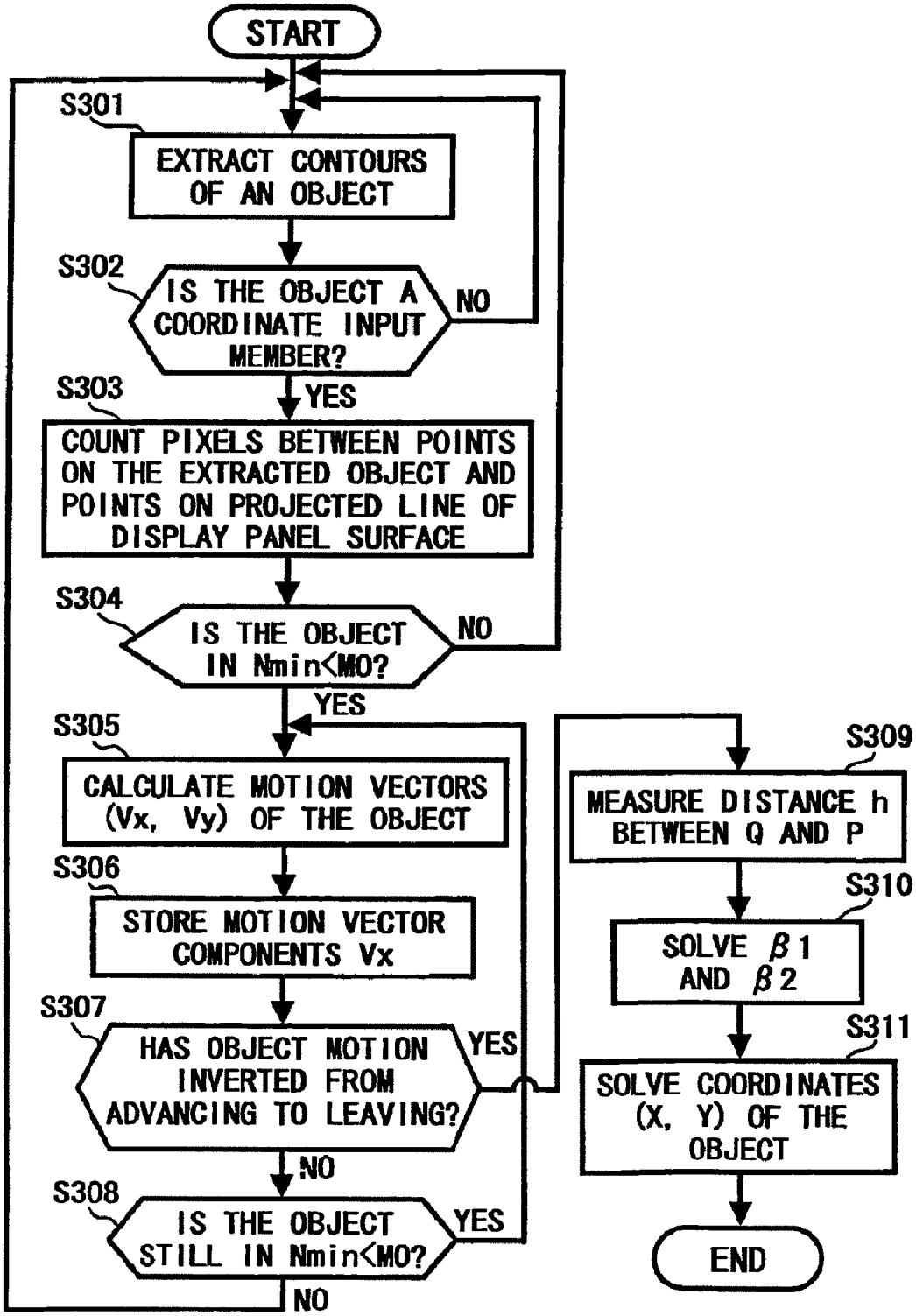
FIG. 12 is a flowchart illustrating operational steps for practicing a coordinate data inputting operation as another example configured according to the present invention.

FIG. 12 is a flowchart illustrating operational steps for practicing a coordinate data inputting operation as another example configured according to the present invention. This example is applied for, e.g., inputting a pointing or clicking operation for an icon, an item in a menu, etc., being displayed on the display panel 12. The method is also executed on the coordinate data input system 1S of FIG. 1.

With reference to FIG. 12, in step S301, the first image processing circuit 30 or the CPU 20 extracts contours of an object as a coordinate input member from frame image data received from the first electronic camera 10. In step S302, the first image processing circuit 30 or the CPU 20 determines whether the contour shape of the object is regarded as a coordinate input member. When the contour shape of the object is regarded as a coordinate input member, i.e., YES in step S302, the process proceeds to step S303, and when the contour shape of the object is not regarded as a coordinate input member, i.e., NO in step S302, the process returns to step S301.

In step S303, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 regarding each of the distances. A distance between two points is obtained as the product of the pixel pitch of the CMOS image sensor 51 and the number of pixels between the points.

In step S304, the first image processing circuit 30 or the CPU 20 extracts the least number of pixels Nmin among the plural numbers of pixels counted in step S303, and determines whether the minimum value Nmin is smaller than a predetermined number M0. When the minimum value Nmin is smaller than the predetermined number M0, i.e., YES in step S304, the process proceeds to step S305, and when the minimum value Nmin is not smaller than the predetermined number M0, i.e., NO in step S304, the process returns to step S301.

In step S305, the first image processing circuit 30 or the CPU 20 calculates motion vectors (Vx, Vy) regarding predetermined plural points on the extracted contours of the object including the nearest point to the display panel 12. The component Vx is a vector component along the Xcamera axis, i.e., a direction perpendicular to the projected line of the surface of the display panel 12, and the component Vy is a vector component along the Ycamera axis, i.e., a direction along the surface of the display panel 12. For calculating the motion vectors, the first image processing circuit 30 or the CPU 20 uses two consecutive frames of image data and utilizes the optical flow method stated above.

In step S306, the CPU 20 successively stores motion vector components along the direction Xcamera, i.e., component Vx, of plural frames in the main memory 21 as trace data.

In step S307, the CPU 20 determines whether a moving direction of the extracted object has been reversed from an advancing motion toward the display panel 12 to a leaving motion from the panel 12 based on the trace data of motion vectors. When the moving direction of the extracted object has been reversed, i.e., YES in step S307, the process branches to step S309, and when the moving direction has not reversed, i.e., No in step S307, the process proceeds to step S308.

In step S308, the first image processing circuit 30 or the CPU 20 determines whether the object is within a predetermined region above the display panel 12 using the trace data of motion vector components Vx of the object. When the object is in the predetermined region, i.e., YES in step S308, the process returns to step 5305 to obtain new motion vectors again, and when the object is out of the predetermined region, i.e., NO in step S308, the process returns to step S301.

In step S309, the first image processing circuit 30 or the CPU 20 measures a distance h on the CMOS image sensor 51 between the optical axis crossing point Q and a projected point P of a contacting point A(x, y) of the object. For projected point P, for example, a starting point of a motion vector being centered among plural motion vectors, whose direction has been reversed, is used.

In step. S310, referring to FIG. 4, the CPU 20 solves the angle β1 by using the equations (1) and (2), with known quantities f and α, and the measured distance h. As regards image data received from the second electronic camera 11, the CPU 20 solves the angle β2 in a similar manner.

In step S311, referring to FIG. 3, the CPU 20 solves the coordinates x and y of the object on the display panel 12 by using the equations (3) and (4), with known quantities L, and the solved angles β1 and β2.

Figure 13:
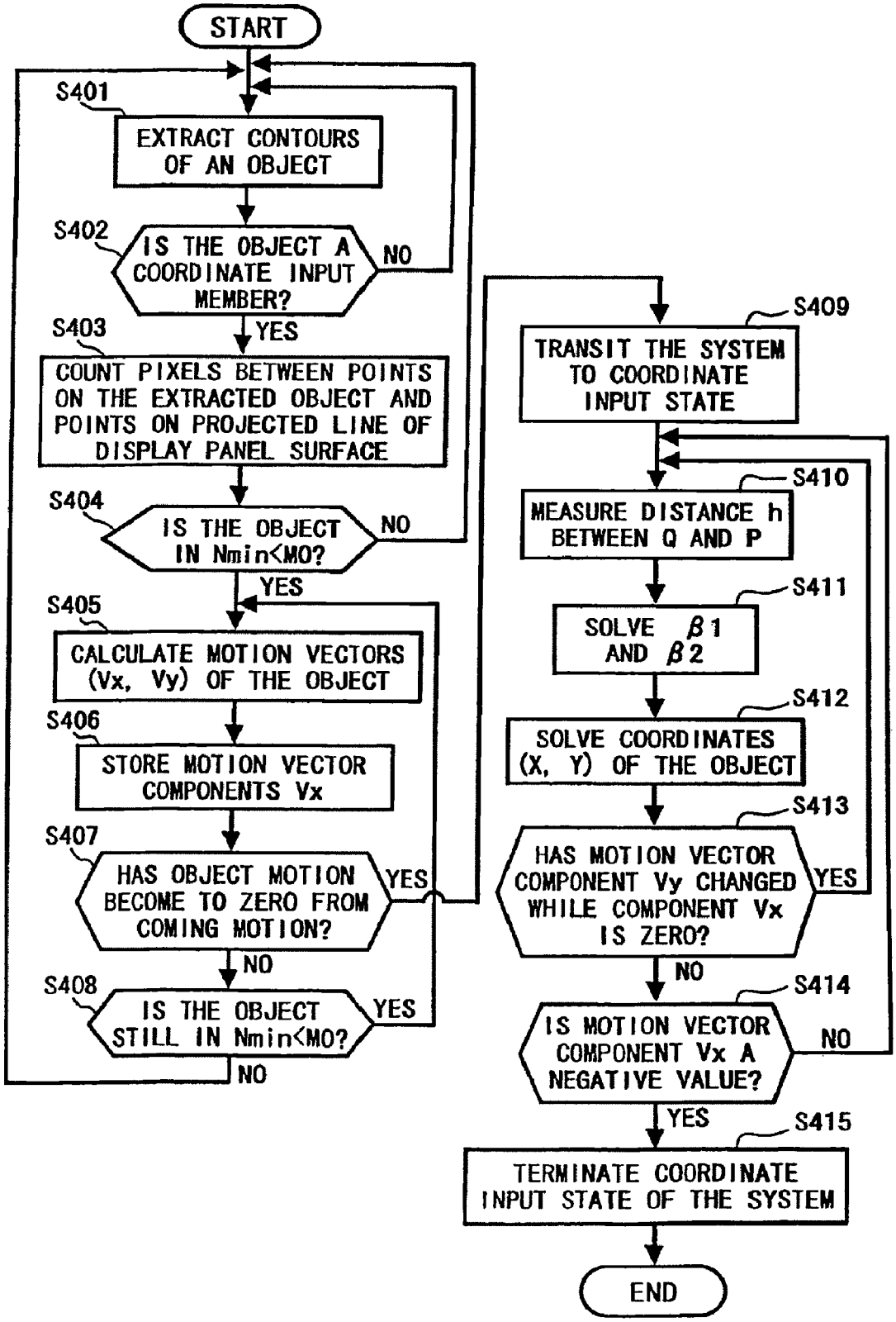
FIG. 13 is a flowchart illustrating operational steps for practicing a coordinate data inputting operation as another example configured according to the present invention.

FIG. 13 is a flowchart illustrating operational steps for practicing a coordinate data inputting operation as another example configured according to the present invention. This example is applied to, for example, inputting information while a coordinate input member is staying at the surface of the display panel 12. The method is also executed on the coordinate data input system 1S of FIG. 1.

Referring to FIG. 13, in step S401, the first image processing circuit 30 or the CPU 20 extracts contours of an object as a coordinate input member from frame image data received from the first electronic camera 10. In step S402, the first image processing circuit 30 or the CPU 20 determines whether the contour shape of the object is regarded as a coordinate input member. When the contour shape of the object is regarded as a coordinate input member, i.e., YES in step S402, the process proceeds to step S403, and when the contour shape of the object is not regarded as a coordinate input member, i.e., NO in step 5402, the process returns to step S401.

In step S403, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 for each of the distances. A distance between two points is obtained as the product of the pixel pitch of the CMOS image sensor 51 and the number of pixels between the points.

In step S404, the first image processing circuit 30 or the CPU 20 extracts the least number of pixels Nmin among the plural numbers of pixels counted in step S403, and determines whether the minimum value Nmin is smaller than a predetermined number M0. When the minimum value Nmin is smaller than the predetermined number M0, i.e., YES in step S404, the process proceeds to step S405, and when the minimum value Nmin is not smaller than the predetermined number M0, i.e., NO in step S404, the process returns to step S401.

In step S405, the first image processing circuit 30 or the CPU 20 calculates motion vectors (Vx, Vy) regarding predetermined plural points on the extracted contours of the object including the nearest point to the display panel 12. Vx is a vector component along the Xcamera axis, i.e., a direction perpendicular to the projected line of the surface of the display panel 12, and Vy is a vector component along the Ycamera axis, i.e., a direction along the surface of the display panel 12. For calculating the motion vectors, the first image processing circuit 30 or the CPU 20 uses two consecutive frames and utilizes the optical flow method stated above.

In step S406, the CPU 20 successively stores motion vector components along the direction Xcamera of the calculated vectors, i.e., the component Vx, in the main memory 21 as trace data.

In step S407, the CPU 20 determines whether the vector component Vx, which is perpendicular to the plane of the display panel 12, has become a value of zero from an advancing motion toward the display panel 12. When the component Vx of the motion vector has become practically zero, i.e., YES in step S407, the process branches to step S409, and when the component Vx has not become zero yet, i.e., No in step S407, the process proceeds to step S408.

In step S408, the CPU 20 determines whether the object is located within a predetermined region above the display panel 12 using the trace data of motion vectors component Vx of the object. When the object is located in the predetermined region, i.e., YES in step S408, the process returns to step S405 to obtain new motion vectors again, and when the object is out of the predetermined region, i.e., NO in step S408, the process returns to step S401.

In step S409, the CPU 20 determines that a coordinate inputting operation has been started, and transits the state of the coordinate data input system 1S to a coordinate input state. In step S410, the first image processing circuit 30 or the CPU 20 measures a distance h between the optical axis crossing point Q and the projected point P of a contacting point A(x, y) of the object on the CMOS image sensor 51.

In step S411, referring to FIG. 4, the CPU 20 solves the angle β1 by using the equations (1) and (2), with known quantities f and α, and the measured distance h. As regards image data received from the second electronic camera 11, the CPU 20 solves the angle β2 in a similar manner. In step S412, referring to FIG. 3, the CPU 20 solves the coordinates x and y of the object on the display panel 12 by using the equations (3) and (4), with known quantities L, and the solved angles β1 and β2.

In step S413, the CPU 20 determines whether the motion vector component Vy at the point P has changed while the other motion vector component Vx is value of zero. In other words, the CPU 20 determines whether the object has moved in any direction whatever along the surface of the display panel 12. When the motion vector component Vy has changed while the other motion vector component Vx is zero, i.e., YES in step S413, the process returns to step S410 to obtain the coordinates x and y of the object at a moved location. When the motion vector component Vy has not changed, i.e., No in step S413, the process proceeds to step S414.

Further, the CPU 20 may also determine the motion vector component Vy under a condition that the other component Vx is a positive value, which represents a direction approaching toward the display panel 12 in addition to the above-described condition of the component Vx is zero.

In step S414, the CPU 20 determines whether the motion vector component Vx regarding the point P has become a negative value, which represents a direction leaving from the display panel 12. When the motion vector component Vx has become a negative value, i.e., YES in step S414, the process proceeds to step S415, and if NO, the process returns to step S410. In step S415, the CPU 20 determines that the coordinate inputting operation has been completed, and terminates the coordinate input state of the coordinate data input system 1S.

Thus, the CPU 20 can generate display data according to the coordinated data obtained during the above-described coordinate input state, and transmit the generated display data to the display controller 29 to display an image of the input data on the display panel 12.

Figure 14:
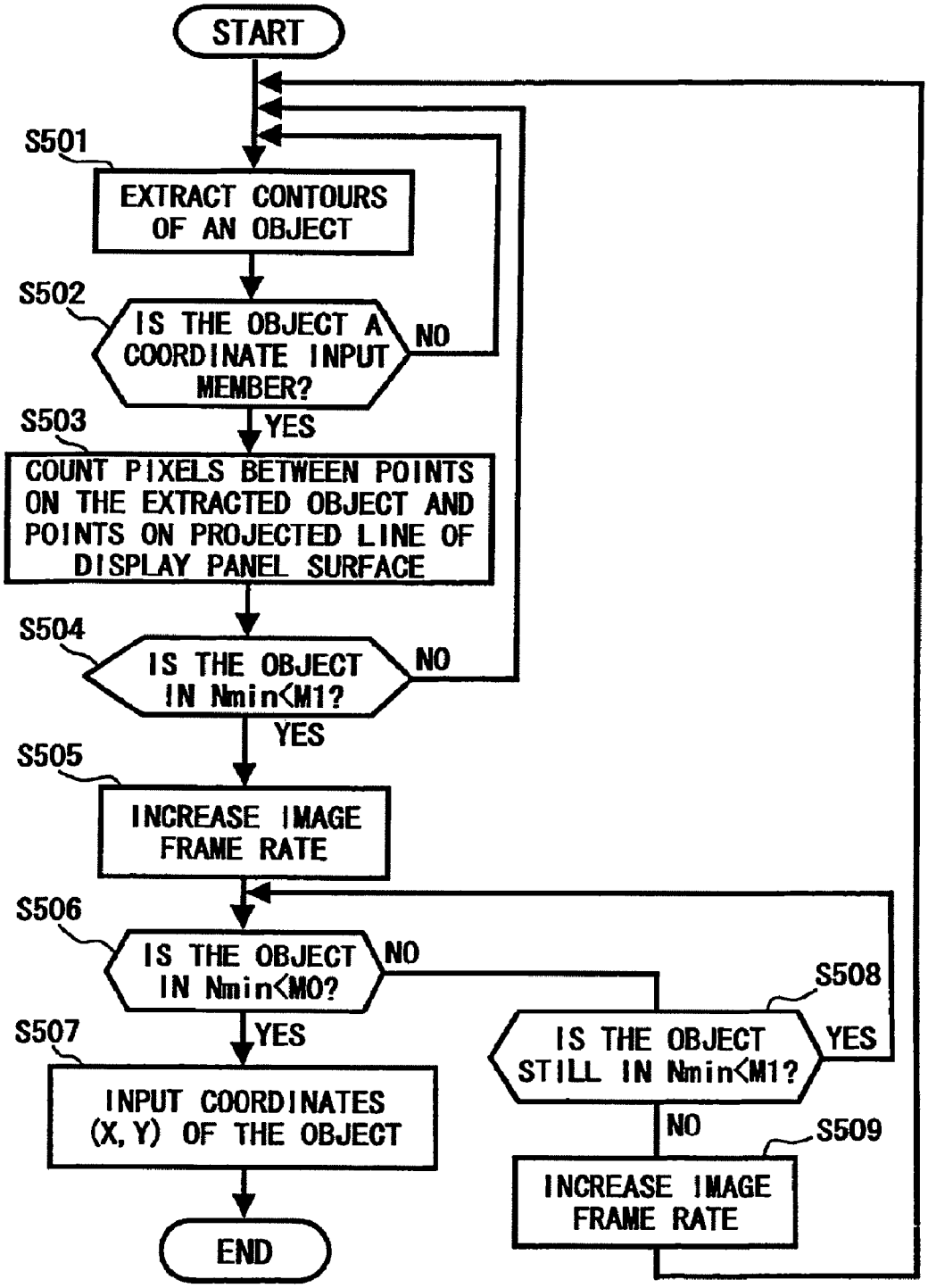
FIG. 14 is a flowchart illustrating operational steps for practicing a coordinate data inputting operation as another example configured according to the present invention.

FIG. 14 is a flowchart illustrating operational steps for practicing a coordinate data inputting operation as another example configured according to the present invention. These operational steps are also executed on the coordinate data input system 1S of FIG. 1. In this example, a frame rate output from each of the first and second electronic cameras 10 and 11 varies depending on a distance of a coordinate input member from the display panel 12. The frame rate may be expressed as the number of frames per one second.

When a coordinate input member is within a predetermined distance, the frame rate output from each of the CMOS image sensors 51 and 53 is increased to obtain the motion of the coordinate input member further in detail. When the coordinate input member is out of the predetermined distance, the output frame rate is decreased to reduce loads of the other devices in the coordinate data input system 1S, such as the first image processing circuit 30, the second image processing circuit 31, the CPU 20, etc.

The frame rate of each of the first and second electronic cameras 10 and 11, i.e., the frame rate of each of the CMOS image sensors 51 and 53, is capable of being varied as necessary between at least at two frame rates, one referred to as a high frame rate and the other referred to as a low frame rate. A data size per unit time input to the first image processing circuit 30 and the second image processing circuit 31 varies depending on the frame rate of the image data. When the coordinate data input system 1S is powered on, the low frame rate is initially selected as a default frame rate.

Referring now to FIG. 14, in step S501, the first image processing circuit 30 or the CPU 20 extracts contours of an object as a coordinate input member from frame image data received from the first electronic camera 10. In step S502, the first image processing circuit 30 or the CPU 20 determines whether the contour shape of the object is regarded as a coordinate input member. When the contour shape of the object is regarded as a coordinate input member, i.e., YES in step S502, the process proceeds to step S503, and when the contour shape of the object is not regarded as a coordinate input member, i.e., NO in step S502, the process returns to step S501.

In step S503, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 regarding each of the distances. A distance between two points is obtained as the product of the pixel pitch of the CMOS image sensor 51 and the number of pixels between the points.

In step S504, the first image processing circuit 30 or the CPU 20 extracts the least number of pixels Nmin among the plural numbers of pixels counted in step S503, and determines whether the minimum value Nmin is smaller than a first predetermined number M1. When the minimum value Nmin is smaller than the first predetermined number M1, i.e., YES in step S504, the process proceeds to step S505, and when the minimum value Nmin is not smaller than the first predetermined number M1, i.e., NO in step S504, the process returns to step S501.

The first predetermined number M1 in the step S504 is larger than a second predetermined number M0 for starting trace of vector data used in the following steps.

In step S505, the first image processing circuit 30 sends a command to the first electronic camera 10 to request increasing the output frame rate of the CMOS image sensor 51. Such a command for switching the frame rate, i.e., from the low frame rate to the high frame rate or from the high frame rate to the low frame rate, is transmitted through a cable that also carries image data. When the first electronic camera 10 receives the command, the first electronic camera 10 controls the CMOS image sensor 51 to increase the output frame rate thereof. As an example for increasing the output frame rate of the CMOS image sensor 51, the charge time of each of photoelectric conversion devices, i.e., the imaging cells, in the CMOS image sensor 51 may be decreased.

In step S506, the CPU 20 determines whether the object is in a second predetermined distance from the display panel 12 to start a tracing operation of motion vectors of the object. In other words, the CPU 20 determines if the minimum value Nmin is smaller than the second predetermined number M0, which corresponds to the second predetermined distance, and if YES, the process proceeds to step S507, and if No, the process branches to step S508.

In step S507, the CPU 20 traces the motion of the object and generates coordinate data of the object according to the traced motion vectors. As stated earlier, the second predetermined number M0 is smaller than the first predetermined number M1; therefore, the spatial range for tracing motion vectors of the object is smaller than the spatial range for outputting image data with the high frame rate from the CMOS image sensor 51.

In step S508, the first image processing circuit 30 determines whether the minimum value Nmin is still smaller than the first predetermined number M1, i.e., the object is still in the range of the first predetermined number M1. When the minimum value Nmin is still smaller than the first predetermined number M1, i.e., YES in step S508, the process returns to step S506, and when the minimum value Nmin is no longer smaller than the first predetermined number M1, i.e., NO in step S508, the process proceeds to step S509.

In step S509, the first image processing circuit 30 sends a command to the first electronic camera 10 to request decreasing the output frame rate of the CMOS image sensor 51, and then the process returns to the step S501. Receiving the command, the first electronic camera 10 controls the CMOS image sensor 51 to decrease again the output frame rate thereof.

In the above-described operational steps, the second electronic camera 11 and the second image processing circuit 31 operate substantially the same as the first electronic camera 10 and the first image processing circuit 30 operate.

In this example, while the coordinate input device is a distant place from the display panel 12, the first electronic camera 10 and the second electronic camera 11 operate in a low frame rate, and output a relatively small quantity of image data to the other devices. Consequently, power consumption of the coordinate data input system 1S is decreased.

Figure 15:
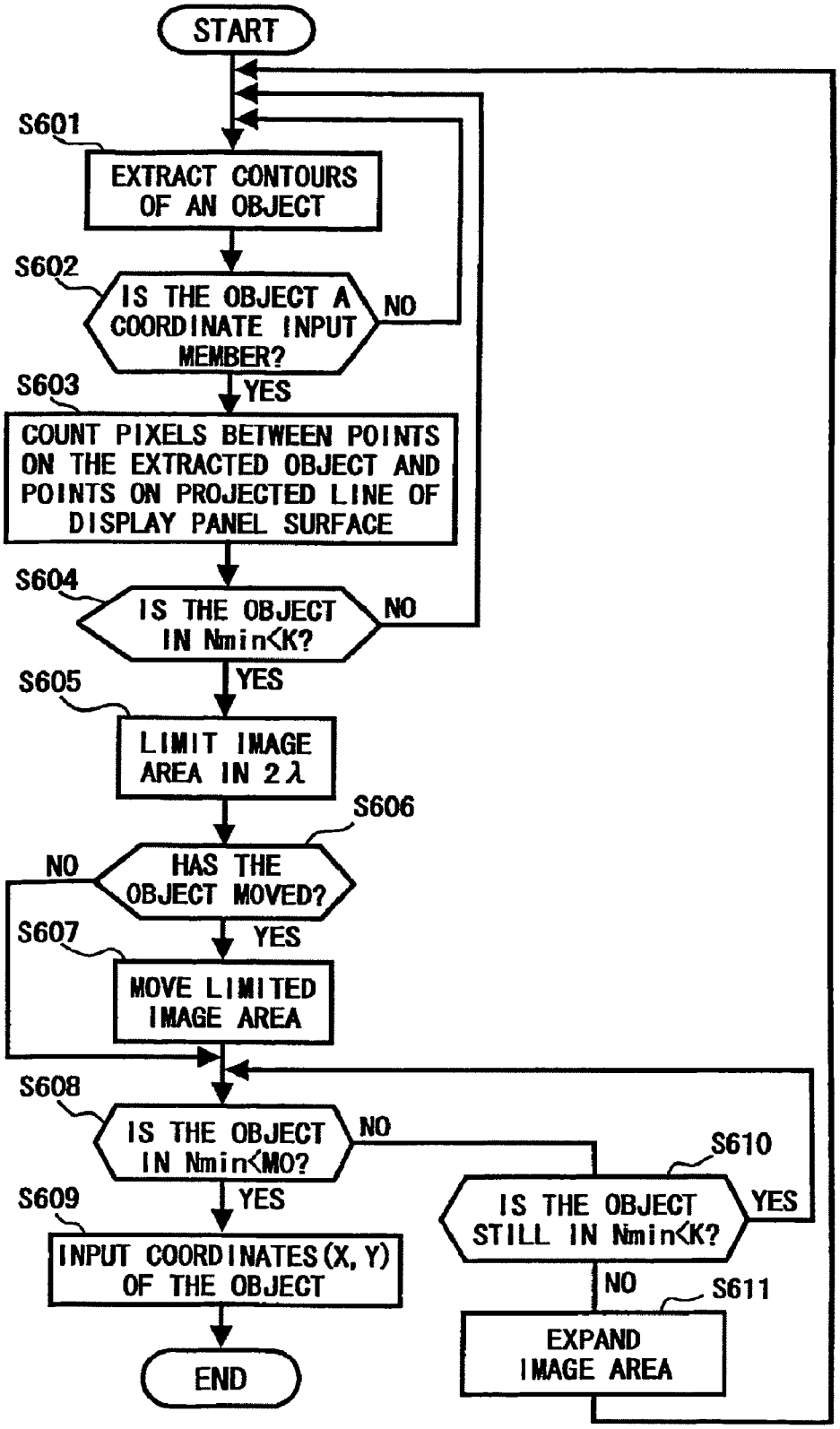
FIG. 15 is a flowchart illustrating operational steps for practicing a coordinate data inputting operation as another example configured according to the present invention.

FIG. 15 is a flowchart illustrating operational steps for practicing a coordinate data inputting operation as another example configured according to the present invention. These operational steps are also executed on the coordinate data input system 1S of FIG. 1. In this example, an image area output from each of the CMOS image sensors 51 and 53 varies depending upon a distance of a coordinate input member from the display panel 12. In other words, the output image area is limited within a predetermined distance from a coordinate input member depending on a location of the coordinate input member. When the output image area is limited in a small area, an image data size included in a frame is also decreased, and consequently the decreased data size decreases loads of devices, such as the first image processing circuit 30, the second image processing circuit 31, the CPU 20, etc. That is, the power consumption of the coordinate data input system 1S is also decreased.

The pixels in each of the CMOS image sensors 51 and 53 can be randomly accessed by pixel, i.e., the pixels in the CMOS image sensors 51 and 53 can be randomly addressed to output the image signal thereof. This random accessibility enables the above-stated output image area limitation. When the coordinate data input system 1S is powered on, the output image area is set to cover a region surrounded by a whole horizontal span of and a predetermined altitude range above the display panel 12 as a default image area.

Referring now to FIG. 15, in step S601, the first image processing circuit 30 or the CPU 20 extracts contours of an object as a coordinate input member from frame image data received from the first electronic camera 10. In step S602, the first image processing circuit 30 or the CPU 20 determines whether the contour shape of the object is regarded as a coordinate input member. When the contour shape of the object is regarded as a coordinate input member, i.e., YES in step S602, the process proceeds to step S603, and when the contour shape of the object is not regarded as a coordinate input member, i.e., NO in step S602, the process returns to step S601.

In step S603, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 for each of the distances for each measuring distance. A distance between two points is obtained as the product of the pixel pitch of the CMOS image sensor 51 and the number of pixels between the two points.

In step S604, the first image processing circuit 30 or the CPU 20 extracts the least number of pixels Nmin among the plural numbers of pixels counted in step S603, and determines whether the minimum value Nmin is smaller than a predetermined number K. When the minimum value Nmin is smaller than the predetermined number K, i.e., YES in step S604, the process proceeds to step S605, and when the minimum value Nmin is not smaller than the predetermined number K, i.e., NO in step S604, the process returns to step S601.

Figure 16A:
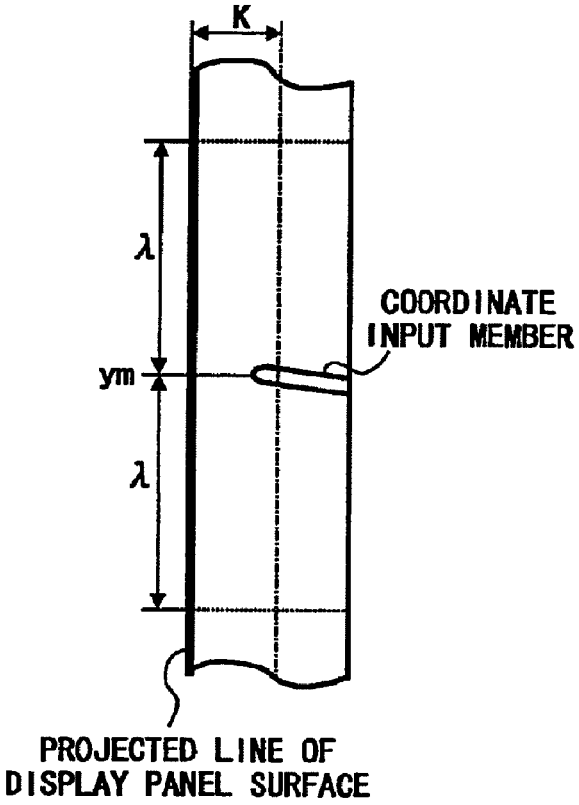
FIG. 16A is a diagram illustrating an image captured by the first electronic camera and an output limitation of the image.

FIG. 16A is a diagram illustrating an image captured by the first electronic camera 10 and an output limitation of the image. In FIG. 16A, the symbol K denotes a predetermined distance, and the symbol ym denotes a coordinate of the illustrated coordinate input member from an end of the CMOS image sensor 51 in the Ycamera axis direction.

Referring back to FIG. 15, in step S605, the first image processing circuit 30 first calculates the distance ym of the object from an end of the CMOS image sensor 51. After that, the first image processing circuit 30 sends a command to the first electronic camera 10 to limit the output image area of the CMOS image sensor 51 in a relatively small area. Referring back to FIG. 16A, the limited area corresponds to an inside area enclosed by a predetermined distance λ from the coordinate input member for both sides in the Ycamera axis direction.

Such a command for limiting the output image area is transmitted through a common cable that carries image data. When the first electronic camera 10 receives the command, the first electronic camera 10 controls the CMOS image sensor 51 so as to limit the output image area thereof.

Figure 16B:
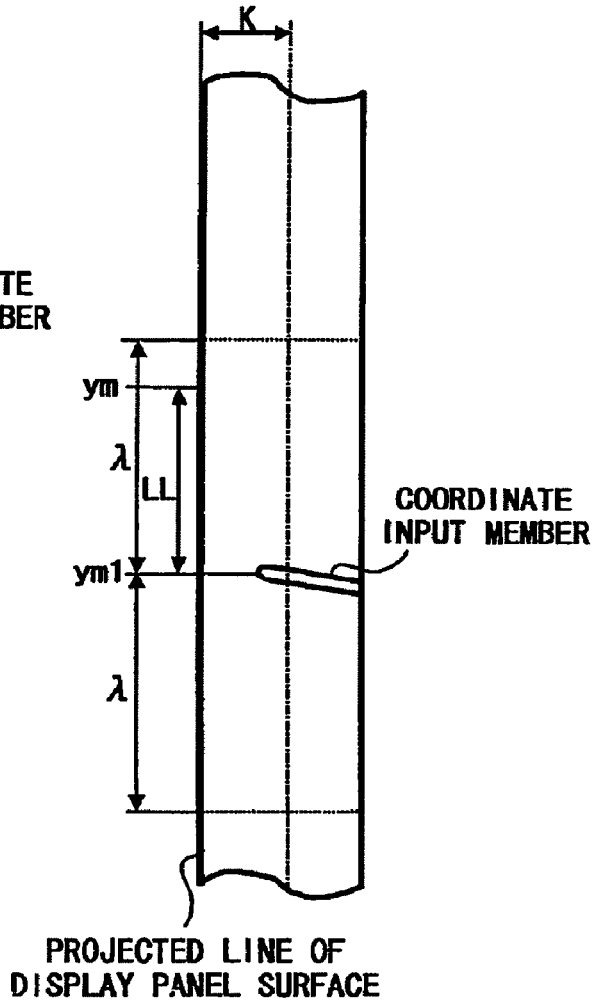
FIG. 16B is a diagram illustrating an image captured by the first electronic camera and a displaced output limitation of the image.

FIG. 16B is a diagram illustrating an image captured by the first electronic camera 10 and a displaced output limitation of the image. In FIG. 16B, the symbol ym denotes an original location of a coordinate input member and the symbol ym1 denotes a displaced location thereof. The symbol LL denotes a displacement of the coordinate input member from the original location ym to the displaced location ym1. As illustrated, when the coordinate input member moves from the original location ym to the location ym1, the limiting range λ of the output image also follows to the new location ym1.

Referring back to FIG. 15, in step S606, the first image processing circuit 30 determines whether the object has moved in the Ycamera axis direction. When the object has moved, i.e., YES in step S606, the process proceeds to step S607, and if NO in step S606, the process skips the step S607 and jumps to step S608.

In step S607, the first image processing circuit 30 sends a command to the first electronic camera 10 to limit the output image area of the CMOS image sensor 51 in the distance λ around the moved location ym1 of the object as illustrated in FIG. 16B. Thus, as long as the object stays under the predetermined altitude K above the display panel 12, the first electronic camera 10 carries on sending images limited in an area corresponding to the distance λ around the object to the first image processing circuit 30.

In step S608, the CPU 20 determines whether the object is within a predetermined distance from the display panel 12 to start a tracing operation of motion vectors of the object. In other words, the CPU 20 determines if the minimum value Nmin is smaller than the predetermined number M0, which corresponds to the predetermined distance, and if YES in step S608, the process proceeds to step S609, and if No in step S608, the process branches to step S610.

In step S609, the CPU 20 traces motion vectors of the object, and inputs coordinate data of the object according to traced motion vectors.

In step S610, the CPU 20 determines whether the object is still within the predetermined altitude K above the display panel 12 for outputting image data limited in the range 2λ. When the object is within the predetermined altitude K, i.e., YES in step S610, the process returns to step S608, and when the object is no longer within the predetermined altitude K, i.e., NO in step S610, the process proceeds to step S611.

In step S611, the first image processing circuit 30 sends a command to the first electronic camera 10 to expand the output image area of the CMOS image sensor 51 to cover the whole area of the display panel 12, and then the process returns to the step S601. When the first electronic camera 10 receives the command, the first electronic camera 10 controls the CMOS image sensor 51 to expand the output image that covers the whole area of the display panel 12 so as to be in the same state as when the coordinate data input system 1S is turned on.

In the above-described operational steps, the second electronic camera 11 and the second image processing circuit 31 operate substantially the same as the first electronic camera 10 and the first image processing circuit 30 operate.

Present-day large screen display devices in the market, such as a plasma display panel (PDP) or a rear projection display generally have a 40-inch to 70-inch screen with 1024-pixel by 768-pixel resolution, which is known as an XGA screen. For capitalizing on those performance figures to a coordinate data input system, image sensors, such as the CMOS image sensors 51 and 53 are desirable to be provided with about 2000 imaging cells (pixels) in a direction. Against those backdrops, the following examples according to the present invention are configured to further reduce costs of a coordinate data input system.

Figure 17:
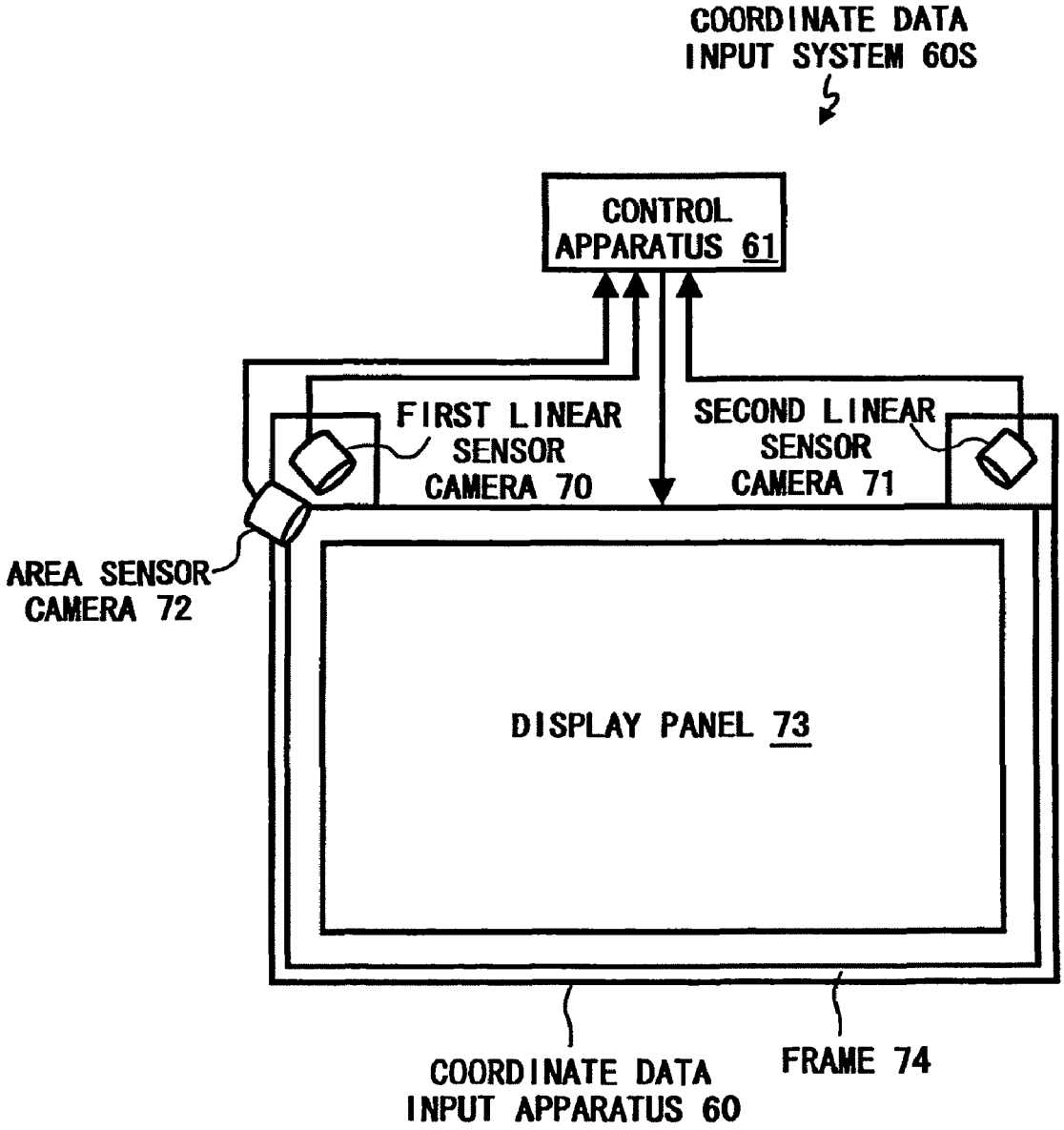
FIG. 17 is a schematic view illustrating a coordinate data input system as another example configured according to the present invention.

FIG. 17 is a schematic view illustrating a coordinate data input system 60S as another example configured according to the present invention. The coordinate data input system 60S includes a coordinate data input apparatus 60 and a control apparatus 61. The coordinate data input apparatus 60 includes a first linear sensor camera 70, a second linear sensor camera 71, an area sensor camera 72, a display panel 73, and a frame 74.

The linear sensor camera may also be referred as a line sensor camera, a one-dimensional sensor camera, a 1-D camera, etc., and the area sensor camera may also be referred as a video camera, a two-dimensional camera, a two-dimensional electronic camera, a 2-D camera, a digital still camera, etc.

Each of the first linear sensor camera 70 and the second linear sensor camera 71 includes a wide-angle lens, which covers 90 degrees or more and a charge coupled device (CCD) linear image sensor. The first linear sensor camera 70 and the second linear sensor camera 71 output image data as analog signals. The CCD linear image sensor is provided with, for example, 2000 pixel imaging cells, i.e., photoelectric converters, such as photodiodes. Thus, the first linear sensor camera 70 and the second linear sensor camera 71 have an image resolution for reading an image on an XGA screen display in a direction along the array of the imaging cells, repetitively.

Further, the two linear sensor cameras are disposed in an appropriate crossing angle of the optical axes thereof, and therefore enables inputting various information including two-dimensional coordinates, such as information on a selecting operation of an item in a menu window, a drawing operation of free hand lines and letters, etc.

The area sensor camera 72 includes a wide-angle lens, which covers 90 degrees, or more, a two-dimensional CMOS image sensor, and an analog to digital converter. The two-dimensional CMOS image sensor has enough imaging cells and an enough output frame rate to enable recognizing the motion of a coordinate input member. The two-dimensional CMOS image sensor, for example, a sensor having 640 by 480 imaging cells, which is referred to as a VGA screen, may be used. The area sensor camera 72 outputs image data as a digital signal, the data being converted by the embedded analog to digital converter.

Any of the first linear sensor camera 70, the second linear sensor camera 71, and the area sensor camera 72 includes a smaller number of imaging pixels compare to the two-dimensional image sensor used in the coordinate data input system 1S of FIG. 1. Consequently, those cameras 70, 71 and 72 can output frame images at a higher frame rate compared to the two-dimensional image sensor used in the coordinate data input system 1S of FIG. 1.

The first linear sensor camera 70 and the area sensor camera 72 are disposed at an upper left corner of the display panel 73, respectively, such that the optical axis each of the wide-angle lenses forms an angle of approximately 45 degrees with a horizontal edge of the display panel 73. The second linear sensor camera 71 is disposed at an upper right corner of the display panel 73, such that the optical axis of the wide-angle lens forms an angle of approximately 45 degrees with a horizontal edge of the display panel 73. Further, the optical axis each of the cameras 70, 71 and 72 is disposed approximately parallel to the display surface of the display panel 73. Thus, each of the cameras 70, 71 and 72 can capture whole the display screen area of the display panel 73, and transmit the captured image data to the control apparatus 61.

The display panel 73 displays an image with, for example, a 48 by 36 inch screen and 1024 by 768-pixel resolution. For example, a plasma display panel, a rear projection liquid crystal display, a rear projection CRT display, etc., may be used as the display panel 73.

The frame 74 is preferably to be structured with a low optical reflection coefficient material, such as black painted or plated metals, black resins, on the surface thereof. The frame 74 is mounted on the left side, the bottom, and the right side circumferences of the display panel 73. Regarding a direction perpendicular to the surface of the display panel 73, the frame 74 is disposed protruding above the surface of the display panel 73. The dimensional amount of the protrusion may be equal to or more than the angle of view of the first linear sensor camera 70 and the second linear sensor camera 71 in the direction perpendicular to the surface of the display panel 73.

Accordingly, when no coordinate input member exists in the vicinity of the surface of the display panel 73, the first linear sensor camera 70 and the second linear sensor camera 71 capture the frame 74 and output image data thereof, i.e., black image data, respectively.

Figure 18:
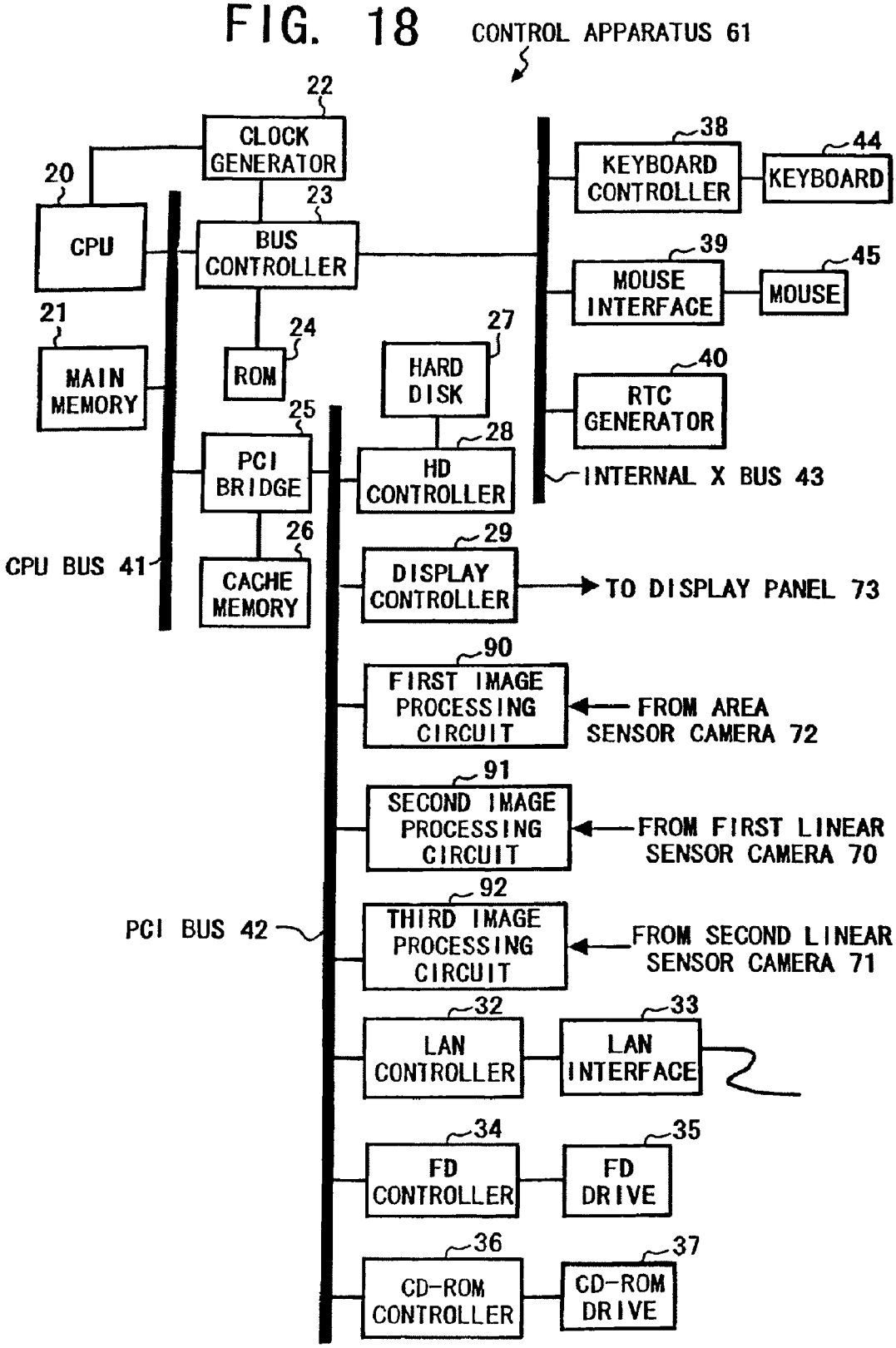
FIG. 18 is an exemplary block diagram of a control apparatus of the coordinate data input system of FIG. 17 configured according to the present invention.

FIG. 18 is an exemplary block diagram of the control apparatus 61 of the coordinate data input system 60S of FIG. 17 configured according to the present invention. Referring to FIG. 18, the control apparatus 61 includes a central processing unit (CPU) 20, a main memory 21, a clock generator 22, a bus controller 23, a read only memory (ROM) 24, a peripheral component interconnect (PCI) bridge 25, a cache memory 26, a hard disk 27, a hard disk (HD) controller 28, a display controller 29, a first image processing circuit 90, a second image processing circuit 91, and a third image processing circuit 92.

The control apparatus 61 also includes a local area network (LAN) controller 32, a LAN interface 33, a floppy disk (FD) controller 34, a FD drive 35, a compact disc read only memory (CD-ROM) controller 36, a CD-ROM drive 37, a keyboard controller 38, a mouse interface 39, a real time clock (RTC) generator 40, a CPU bus 41, a PCI bus 42, an internal X bus 43, a keyboard 44, and a mouse 45.

In FIG. 18, the elements that are substantially the same as those in FIG. 2 are denoted by the same reference numerals. Therefore, a description of the same elements in FIG. 18 as in FIG. 2 is not provided here to avoid redundancy.

Referring to FIG. 18, the first image processing circuit 90 receives digital image data output from the area sensor camera 72 through a digital interface, such as an RS-422 interface. The first image processing circuit 90 then executes an object extraction process, an object shape recognition process, an object motion vector determining process, etc.

The second image processing circuit 91 includes an analog to digital converting circuit, and receives the analog image signal output from the first linear sensor camera 70 via a coaxial cable. Then, the second image processing circuit 91 detects a linear (one-dimensional) location of an object based on the received image signal. Further, the second image processing circuit 91 supplies the first linear sensor camera 70 with a clock signal and an image transfer pulse via the above-described digital interface.

The third image processing circuit 92 is configured with substantially the same hardware as the second image processing circuit 91, and operates substantially the same as the second image processing circuit 91 operates. That is, the third image processing circuit 92 includes an analog to digital converting circuit, and receives the analog image signal output from the second linear sensor camera 71 via a coaxial cable. Then, the third image processing circuit 92 detects a linear location of the object based on the image signal received from the second linear sensor camera 71. The third image processing circuit 92 also supplies the second linear sensor camera 71 with a clock signal and an image transfer pulse via a digital interface, such as an RS-422 interface.

In addition, the clock signal and the image transfer pulse supplied to the first linear sensor camera 70 and those supplied to the second linear sensor camera 71 are maintained in synchronization.

Figure 19:
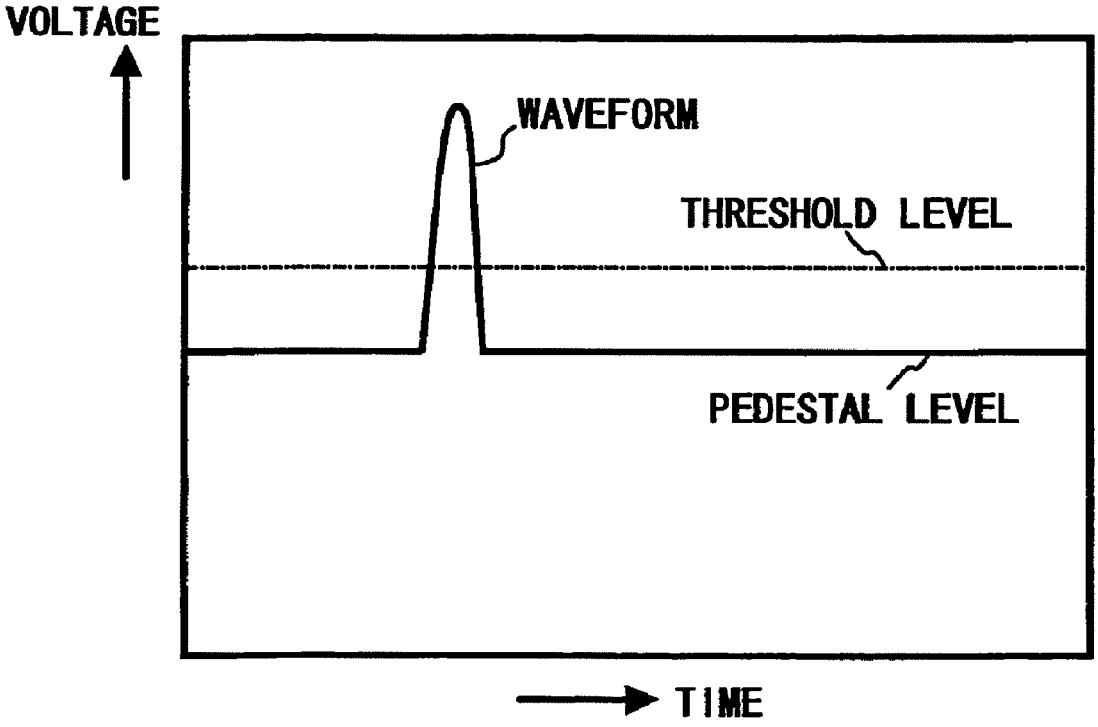
FIG. 19 is a diagram illustrating an analog signal waveform output from a linear sensor camera.

FIG. 19 is a diagram illustrating an analog signal waveform output from the first linear sensor camera 70 or the second linear sensor camera 71. The analog signal waveform in FIG. 19 has been observed with an oscilloscope, and the horizontal axis represents time and the vertical axis represents a voltage. In other words, since the first linear sensor camera 70 and the second linear sensor camera 71 have one-dimensionally aligned imaging cells, respectively, the horizontal axis also corresponds to a direction of the aligned imaging cells.

The PEDESTAL LEVEL of the waveform corresponds to an output voltage of a captured image of the black frame 74. A positive pulse in the waveform corresponds to a captured image of a coordinate input member having a relatively high optical reflection coefficient, e.g., white, red, gray, etc. Lighting fixtures and/or sunlight flooded from windows irradiate both the black frame 74 and a coordinate input member, however the black frame 74 reflects little light and the coordinate input member reflects more light, and thereby the linear CCD image sensors in the linear sensor cameras 70 and 71 generate such a waveform having a pulse thereupon.

The height of the pulse is proportional to the optical reflection coefficient of the coordinate input member. Further, the height and width of the pulse is affected by the size of the coordinate input member and the distance thereof from the first linear sensor camera 70 and the second linear sensor camera 71. For example, when the coordinate input member is thin and located far from the first linear sensor camera 70 and the second linear sensor camera 71, the height and width of the pulse on an output voltage waveform generally become thin and short.

Furthermore, the height and width of the pulse is affected by a location of the coordinate input member in the direction perpendicular to the surface of the display panel 73. For example, when the coordinate input member is contacting the display panel 73, a pulse appears with a maximum height and width. As the coordinate input member leaves from the display panel 73, the height and width of the pulse become thinner and shorter. If the coordinate input member is out of the angle of view of the first linear sensor camera 70 and the second linear sensor camera 71, the pulse disappears.

The alternate long and short dash line denoted by THRESHOLD LEVEL represents a threshold voltage used for discriminating or slicing a pulse portion of the waveform signal. When a pulse portion of the signal is above the threshold level, the location of the peak of the pulse along the time axis is utilized for identifying the location of the coordinate input member on the display panel 73.

As described, the height and width of the pulse is affected by the above described various factors, therefore the threshold level may be determined based on an experiment. Further, the threshold level may be readjusted according to illumination of the room in which the coordinate data input system 60S is installed for use.

Referring back to FIG. 18, the second image processing circuit 91 detects a peak of a pulse in an image signal output from the CCD linear image sensor of the first linear sensor camera 70 as a location P that corresponds to contact point A(x, y) of a coordinate input member, when the pulse exceeds the threshold level. After that, the second image processing circuit 91 measures a distance h between the optical axis crossing point Q of the first linear sensor camera 70 and the projected point P of the contacting point of coordinate input member on the CCD linear image sensor.

The above-stated points P and Q, and distance h substantially correspond to those symbols shown in FIG. 3 and FIG. 4. Therefore, the aforesaid equations (1), (2), (3) and (4) also hold. Where, the distance f between the CCD linear image sensor and the wide-angle lens is known. Likewise, the angle $\alpha$, which the optical axis of the first linear sensor camera 70 forms with the X-line or a horizontal edge of the display panel 73, is known. Accordingly, the angle $\beta$1, which is formed by the X-line and a line connecting the wide-angle lens and a touching point A(x, y) of the coordinate input member, is obtained.

Similarly, the third image processing circuit 92 detects a peak of a pulse in an image signal output from the CCD linear image sensor of the second linear sensor camera 71 as a projected point P of the contacting point of the coordinate input member. Then, the third image processing circuit 92 measures a distance h between the optical axis crossing point Q of the second linear sensor camera 71 and the detected point P on the CCD linear image sensor. Accordingly, the angle $\beta$2 is also obtained. In addition, the distance L, which is the distance between the wide-angle lenses of the first linear sensor camera 70 and the second linear sensor camera 71, is known. Finally, a contacting point A(x, y) of the coordinate input member is solved.

Figure 20:
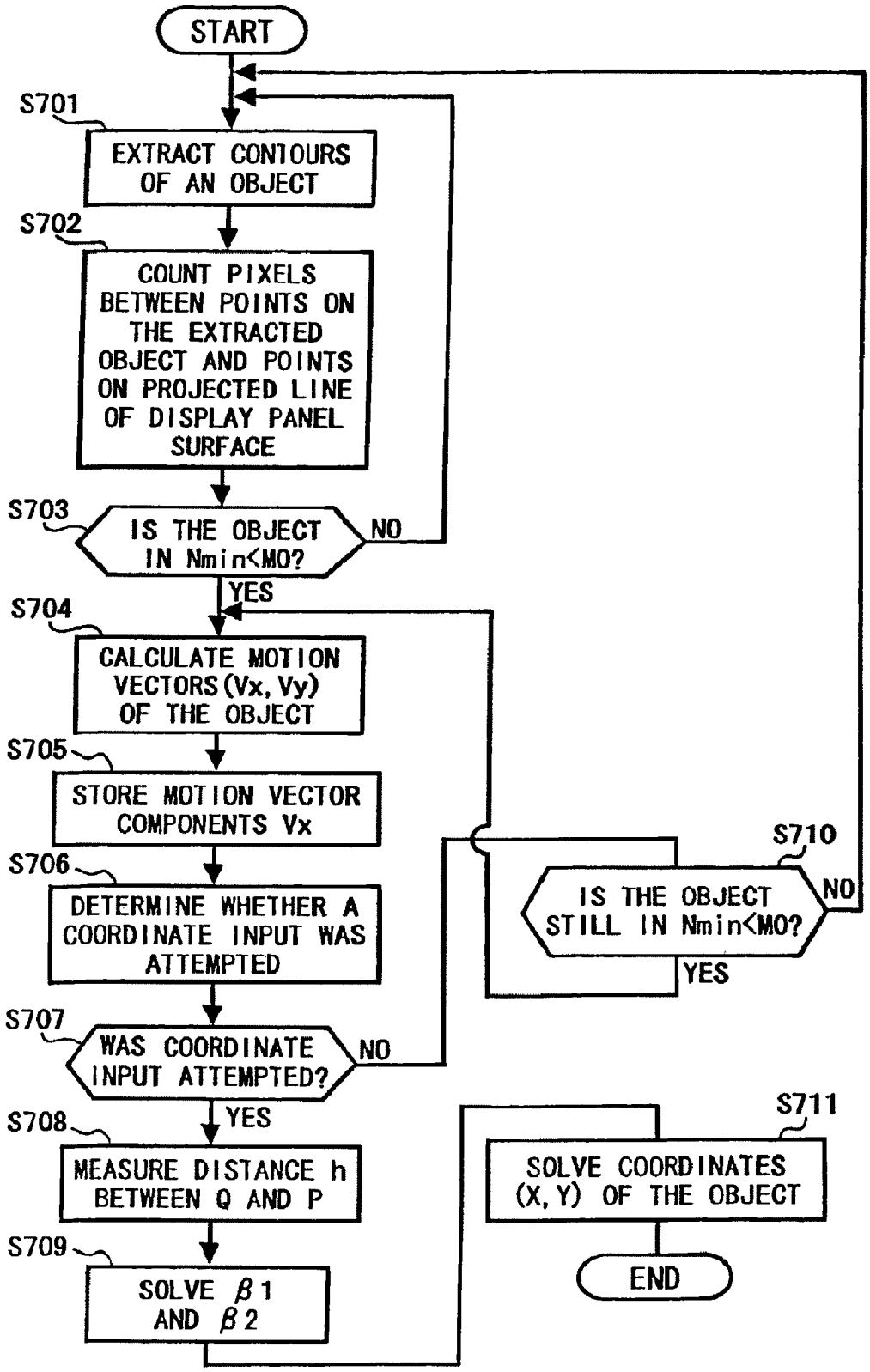
FIG. 20 is a flowchart illustrating operational steps for practicing a coordinate data inputting operation in the coordinate data input system of FIG. 17 as an example configured according to the present invention.

FIG. 20 is a flowchart illustrating operational steps for practicing a coordinate data inputting operation in the coordinate data input system 60S of FIG. 17 as an example configured according to the present invention.

In the first place, the area sensor camera 72 limits an image area in a direction perpendicular to the display panel 73 to output the image data to the first image processing circuit 90 within a predetermined distance from the display panel 73 as necessary. In other words, the area sensor camera 72 clips an upper and/or lower portion of an analog image signal output from the CMOS area sensor thereof. Then, the area sensor camera 72 converts the analog image signal of the remained portion into digital data, and sends out the digital image data as frame image data to the first image processing circuit 90.

With reference to FIG. 20, in step S701, the first image processing circuit 90 or the CPU 20 extracts contours of an object as a coordinate input member from the frame image data received from the area sensor camera 72.

In step S702, the first image processing circuit 90 measures plural distances between points on the contours of the extracted object and points on the projected line of the surface of the display panel 73. For measuring those distances, the first image processing circuit 90 or the CPU 20 counts pixels included between a point on the contours of the extracted object and a point on the projected line of the surface of the display panel 73 for each of the measuring distances. A pixel pitch of the CMOS image sensor is known, and therefore the number of pixels between two points determines the distance between the two points.

In step S703, the first image processing circuit 90 or the CPU 20 extracts the least number of pixels, which is denoted by Nmin, among the plural numbers of pixels counted in step S702, and determines whether the minimum value Nmin is smaller than a predetermined number M0. When the minimum value Nmin is smaller than the predetermined number M0, i.e., YES in step S703, the process proceeds to step S704, and when the minimum value Nmin is not smaller than the predetermined number M0, i.e., NO in step S703, the process returns to step S701.

In step S704, the first image processing circuit 90 or the CPU 20 calculates motion vectors regarding predetermined plural points on the extracted contours of the object including the nearest point, which corresponds the minimum value Nmin, to the display panel 73. For the calculation, the first image processing circuit 90 or the CPU 20 uses the identical frame image data used for extracting the contours and the next following frame image data received from the area sensor camera 72.

In this example, for calculating motion vectors, the first image processing circuit 90 or the CPU 20 first obtains optical flows, i.e., velocity vectors by calculating a rate of temporal change of a pixel image density and a rate of spatial change of image density of pixels surrounding the pixel used for calculating the temporal change. The motion vectors are expressed with the coordinate system (Xcamera, Ycamera), which associates with a line of the surface of the display panel 73 focused on the CMOS area sensor (i.e., Ycamera) and the coordinate perpendicular to the display panel 73 (i.e., Xcamera).

In step S705, the CPU 20 stores the calculated motion to vector components along the direction Xcamera, such as Vx, in the main memory 21. The CPU 20 stores those components obtained from each frame image data in succession. The successively stored data is referred as trace data of motion vectors.

In step S706, the CPU 20 determines whether the extracted object has made an attempt to input coordinates on the display panel 73 based on the trace data. As a determining method, the method illustrated in FIG. 12 may be used. When the object has made an attempt to input coordinates, i.e., YES in step S707, the process proceeds to step S708, and when the object has not made an attempt to input coordinates, i.e., No in step S707, the process branches to step S710.

In step S708, referring to FIG. 4, the second image processing circuit 91 or the CPU 20 measures a distance h between the optical axis crossing point Q and a projected point P of a contacting point A(x, y) of the object according to the image data received from the first linear sensor camera 70. Similarly, the third image processing circuit 92 or the CPU 20 measures a distance h between the optical axis crossing point Q and a projected point P of a contacting point A(x, y) of the object according to the image data received from the second linear sensor camera 71.

In step S709, the second image processing circuit 91 or the CPU 20 solves the angle β1 by using the equations (1) and (2), with known quantities f and α, and the measured distance h. As regards image data received from the second linear sensor camera 71, the third image processing circuit 92 or the CPU 20 solves the angle β2 in a similar manner.

In step S711, referring to FIG. 3, the CPU 20 solves the coordinates x and y of the object on the display panel 73 by using the equations (3) and (4), with known quantities L, and the solved angles β1 and β2.

In step S710, the CPU 20 determines whether the object is within the predetermined region above the display panel 73 using the trace data of motion vector components Vx of the object. In other words, the CPU 20 determines whether the minimum value Nmin among plural distances is still smaller than the predetermined number M0. When the object is in the predetermined region, i.e., YES in step S710, the process returns to step S704 to obtain motion vectors again. When the object is out of the predetermined region, i.e., NO in step S710, the process returns to step S701.

Figure 21:
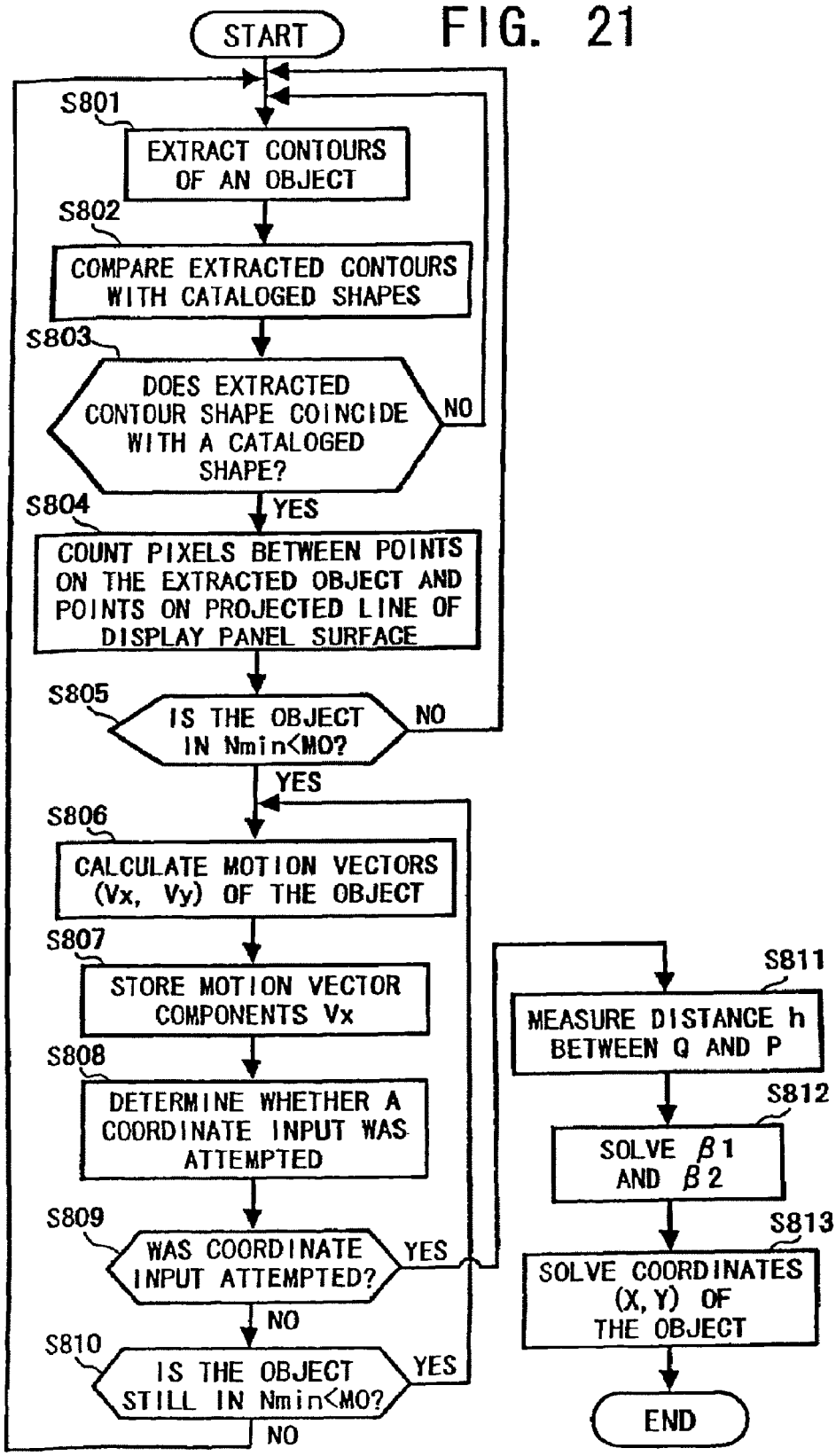
FIG. 21 is a flowchart illustrating operational steps for practicing a coordinate data inputting operation in the coordinate data input system of FIG. 17 as another example configured according to the present invention.

FIG. 21 is a flowchart illustrating operational steps for practicing a coordinate data inputting operation in the coordinate data input system 60S of FIG. 17 as another example configured according to the present invention.

With reference to HG. 21, in step S801, the first image processing circuit 90 or the CPU 20 extracts contours of an object as a coordinate input member from the frame image data received from the area sensor camera 72.

In step S802, the first image processing circuit 90 or the CPU 20 first extracts features of the shape of the extracted contours of the object. For extracting features of the shape, the first image processing circuit 90 or the CPU 20 determines the position of the barycenter of the contours of the object, then measures distances from the barycenter to plural points on the extracted contours for all radial directions like the spokes of a wheel. After that, the CPU 20 characterizes the contour shape of the object based on relations between each direction and the respective distance.

After that, the first image processing circuit 90 or the CPU 20 compares the character extracted contour shape of the object with cataloged shapes of potential coordinate input members. The shapes of potential coordinate input members may be stored in the ROM 24 or the hard disk 27 in advance.

When an operator of the coordinate data input system 60S points to an item in a menu, an icon, draws a line, etc., by using a coordinate input member, the axis of the coordinate input member may tilt in any direction with various tilting angles. Therefore, the first image processing circuit 90 or the CPU 20 may compare the contour shape of the object after being rotated at various angles with the cataloged shapes.

Instead of the rotation of the contour shape, the shapes of potential coordinate input members may be rotated at plural angles in advance, and the rotated shapes are stored in the ROM 24 or the hard disk 27. Thus, the real time rotating operation of the contour shape is not needed; and consequently execution time is saved.

In step S803, the first image processing circuit 90 or the CPU 20 determines whether the contour shape of the object coincides with one of the cataloged shapes of potential coordinate input members. When the identified contour shape coincides with one of the cataloged shapes, i.e., YES in step S803, the process proceeds to step S804, and when the identified contour shape does not coincide with any of the cataloged shapes, i.e., NO in step S803, the process returns to step S801.

In step S804, the first image processing circuit 90 or the CPU 20 measures plural distances between points on the contours of the extracted object and points on the projected line of the surface of the display panel 73. For measuring those distances, the first image processing circuit 90 or the CPU 20 counts pixels included between a point on the contours of the extracted object and a point on the projected line of the surface of the display panel 73 as regards each of the measuring distances.

In step S805, the first image processing circuit 90 or the CPU 20 extracts the least number of pixels, i.e., Nmin, among the plural numbers of pixels counted in step S804, and determines whether the minimum value Nmin is smaller than a predetermined number M0. When the minimum value Nmin is smaller than the predetermined number M0, i.e., YES in step S805, the process proceeds to step S806, and when the minimum value Nmin is not smaller than the predetermined number M0, i.e., NO in step S805, the process returns to step S801.

In step S806, the first image processing circuit 90 or the CPU 20 calculates motion vectors regarding predetermined plural points on the extracted contours of the object including the nearest point to the display panel 73 by using the identical frame image data used for extracting the contours and the next following frame image data received from the area sensor camera 72.

In this example, for calculating motion vectors, the first image processing circuit 90 or the CPU 20 first obtains optical flows, i.e., velocity vectors by calculating a rate of temporal change of a pixel image density and a rate of spatial change of image density of pixels surrounding the pixel used for calculating the temporal change. The motion vectors are expressed with the coordinate system Xcamera, Ycamera.

In step S807, the CPU 20 stores motion vector components along the direction Xcamera of the calculated vectors, such as Vx, in the main memory 21. The CPU 20 stores those components obtained from each frame image data in succession as trace data of the motion vectors.

In step S808, the CPU 20 determines whether the extracted object has made an attempt to input coordinates on the display panel 73 based on the trace data. As a determining method, the method of FIG. 12 may be used. When the object has made an attempt to input coordinates, i.e., YES in step S809, the process branches to step S811, and when the object has not made any attempt to input coordinates, i.e., No in step S809, the process proceeds to step S810.

In step S810, the CPU 20 determines whether the object is within a predetermined region above the display panel 73 using the trace data of motion vector components Vx of the object. When the object is in the predetermined region, i.e., YES in step S810, the process returns to step S806 to obtain motion vectors again, and when the object is out of the predetermined region, i.e., NO in step S810, the process returns to step S801.

In step S811, the second image processing circuit 91 or the CPU 20 measures a distance h between the optical axis crossing point Q and a projected point P of a contacting point A(x, y) of the object according to the image data received from the first linear sensor camera 70. Similarly, the third image processing circuit 92 or the CPU 20 measures a distance h between the optical axis crossing point Q and a projected point P of a contacting point A(x, y) of the object according to the image data received from the second linear sensor camera 71.

In step S812, the second image processing circuit 91 or the CPU 20 solves the angle β1 by using the equations (1) and (2), with known quantities f and α, and the measured distance h. As regards image data received from the second linear sensor camera 71, the third image processing circuit 92 or the CPU 20 solves the angle β2 in a similar manner.

In step S813, referring to FIG. 3, the CPU 20 solves the coordinates x and y of the object on the display panel 73 by using the equations (3) and (4), with known quantities L, and the solved angles β1 and β2.

Figure 22:
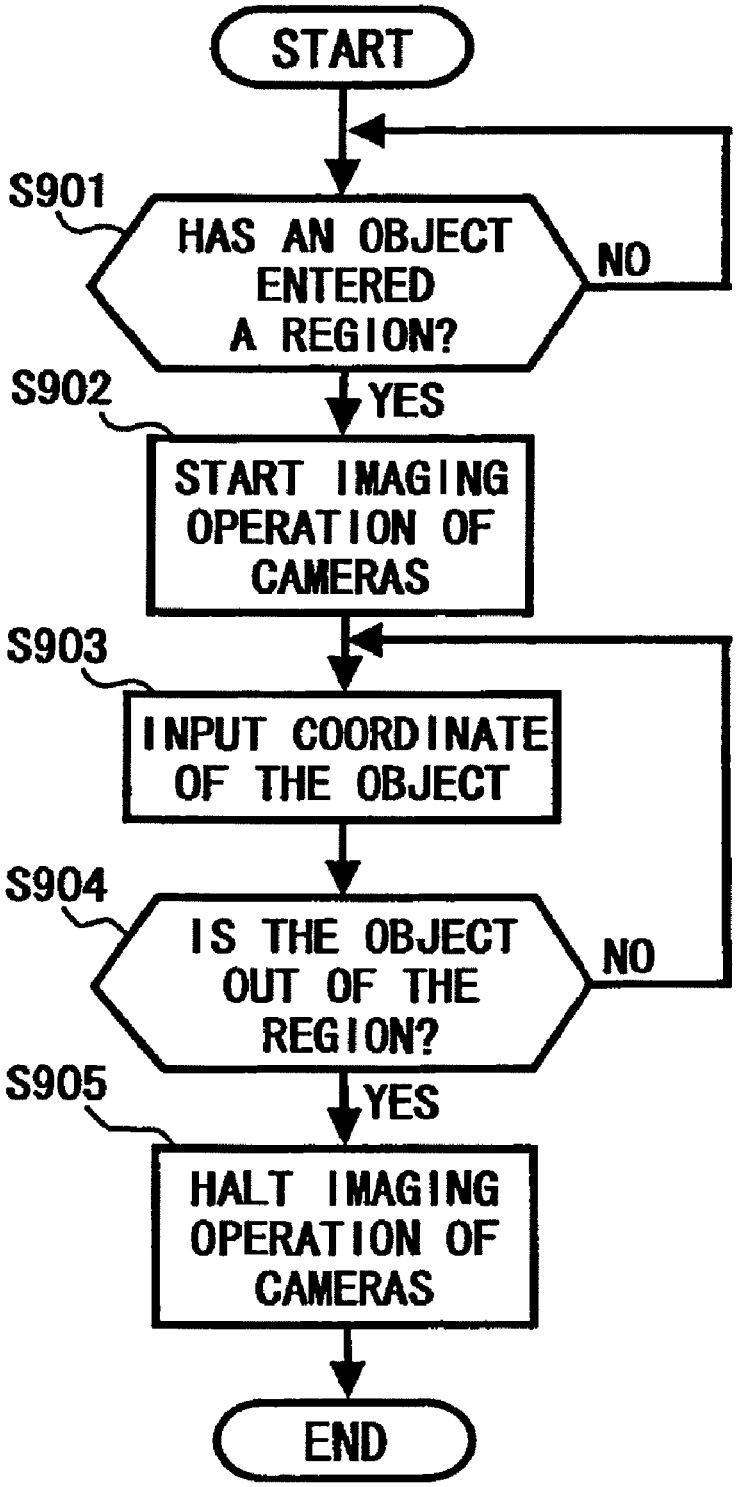
FIG. 22 is a flowchart illustrating operational steps for practicing a coordinate data inputting operation in the coordinate data input system of FIG. 17 as another example configured according to the present invention.

FIG. 22 is a flowchart illustrating operational steps for practicing a coordinate data inputting operation in the coordinate data input system 60S of FIG. 17 as another example configured according to the present invention.

In this example, when a coordinate input member is only in proximity to the display panel 73, the first linear sensor camera 70 and the second linear sensor camera 71 output image data, respectively, to save loads for other devices in the coordinate data input system 60S.

Referring to FIG. 22, in step S901, the first image processing circuit 90 or the CPU 20 determines whether a coordinate input member has entered a predetermined region above the display panel 73 for tracing motion vectors thereof. When a coordinate input member has entered the predetermined region, i.e., YES in step S901, the process proceeds to step S902, and when a coordinate input member has not entered yet, i.e., NO in step S901, the process stays at step S901.

In step S902, the second image processing circuit 91 sends a command to the first linear sensor camera 70 to start imaging operation. Likewise, the third image processing circuit 92 sends a command to the second linear sensor camera 71 to start an imaging operation. Those commands are transmitted via digital interfaces. According to the commands, the first linear sensor camera 70 starts an imaging operation and sends the taken image data to the second image processing circuit 91. The second linear sensor camera 71 also starts an imaging operation and sends the taken image data to the third image processing circuit 92.

In step S903, the second image processing circuit 91 and the third image processing circuit 92 trace the coordinate input member and input coordinates of the coordinate input member on the display panel 73, respectively.

In step S904, the first image processing circuit 90 or the CPU 20 determines whether the coordinate input member is out of the predetermined region for tracing motion vectors thereof. When the coordinate input member is out of the predetermined region, i.e., YES in step S904, the process proceeds to step S905, and when the coordinate input member is still in the predetermined region, i.e., NO in step S904, the process returns to step S903.

In step S905, the second image processing circuit 91 sends a command to the first linear sensor camera 70 to halt the imaging operation. Likewise, the third image processing circuit 92 sends a command to the second linear sensor camera 71 to halt the imaging operation. According to the commands, the first linear sensor camera 70 and the second linear sensor camera 71 halt the imaging operation, respectively.

In the above example, the predetermined region above the display panel 73 is commonly used for both starting imaging operations and tracing motion vectors. However, a predetermined region for starting imaging operations by the first linear sensor camera 70 and the second linear sensor camera 71 may be greater than a predetermined region for tracing motion vectors of a coordinate input member.

Figure 23:
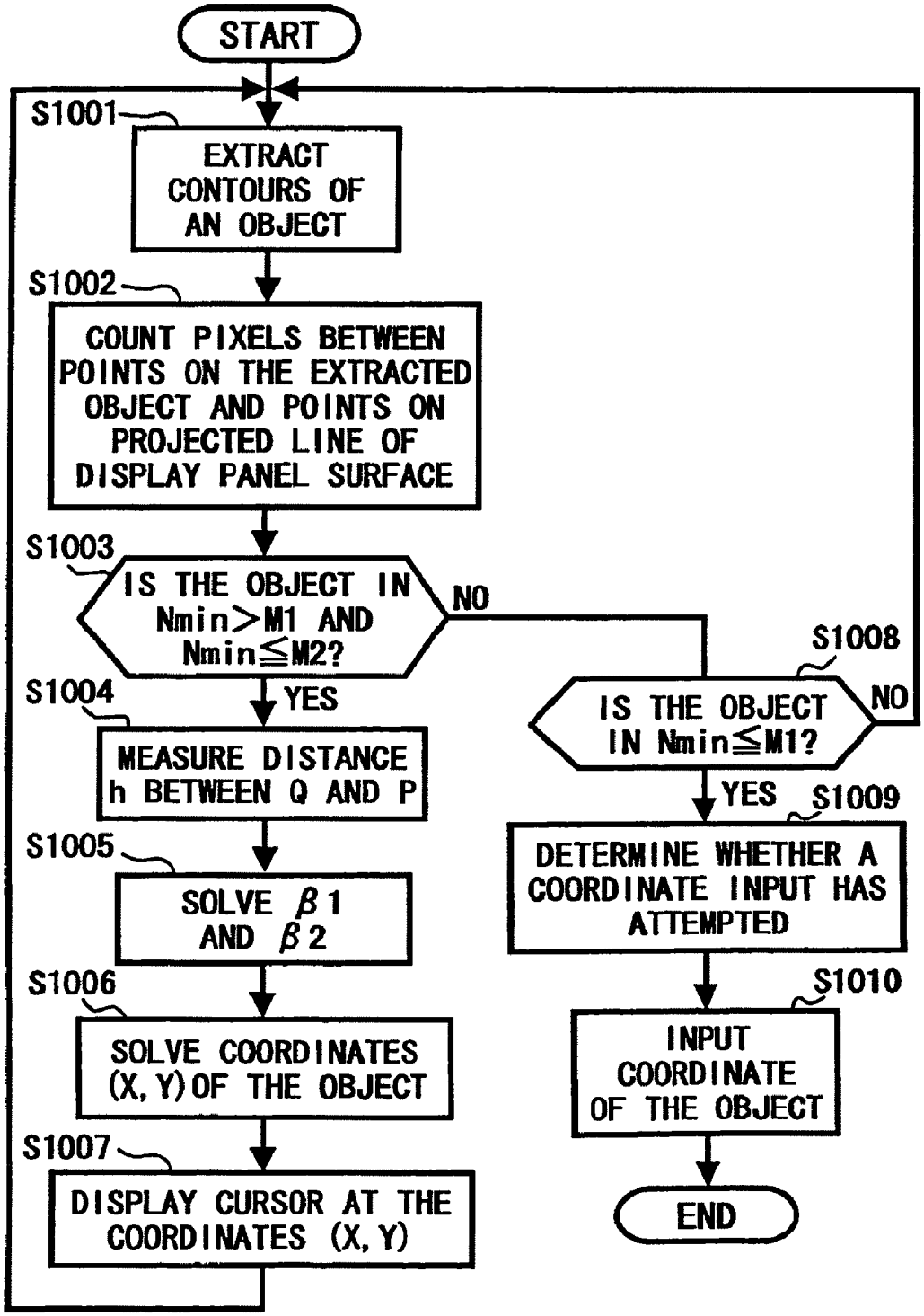
FIG. 23 is a flowchart illustrating operational steps for practicing a coordinate data inputting operation in the coordinate data input system of FIG. 1 as another example configured according to the present invention.

FIG. 23 is a flowchart illustrating operational steps for practicing a coordinate data inputting operation in the coordinate data input system 1S of FIG. 1, as another example configured according to the present invention. In this example, when a coordinate input member is within a first predetermined region above a display device, the location of the coordinate input member is input as coordinates. Thus, the coordinate input member, for example, moves a cursor, draws a line, etc. Further, when the coordinate input member is within a second predetermined region above the display device, the coordinate input member, for example, moves a cursor, receives a gesture command, etc.

With reference to FIG. 23, in step S1001, the first image processing circuit 30 or the CPU 20 extracts contours of an object as a coordinate input member from the frame image data received from the first electronic camera 10.

In step S1002, the first image processing circuit 30 or the CPU 20 measures plural distances between points on the contours of the extracted object and points on the projected line of the surface of the display panel 12. For measuring those distances, the first image processing circuit 30 or the CPU 20 counts pixels included between a point on the contours of the extracted object and a point on the projected line of the surface of the display panel 12 for each of the measuring distances. The number of pixels between two points determines the distance between the two points.

In step S1003, the first image processing circuit 30 or the CPU 20 extracts the least number of pixels, i.e., Nmin, among the plural numbers of pixels counted in step S1002. Then, the first image processing circuit 30 or the CPU 20 determines whether the minimum value Nmin is larger than a first predetermined number M1 and equal to or smaller than a second predetermined number M2.

Figure 24:
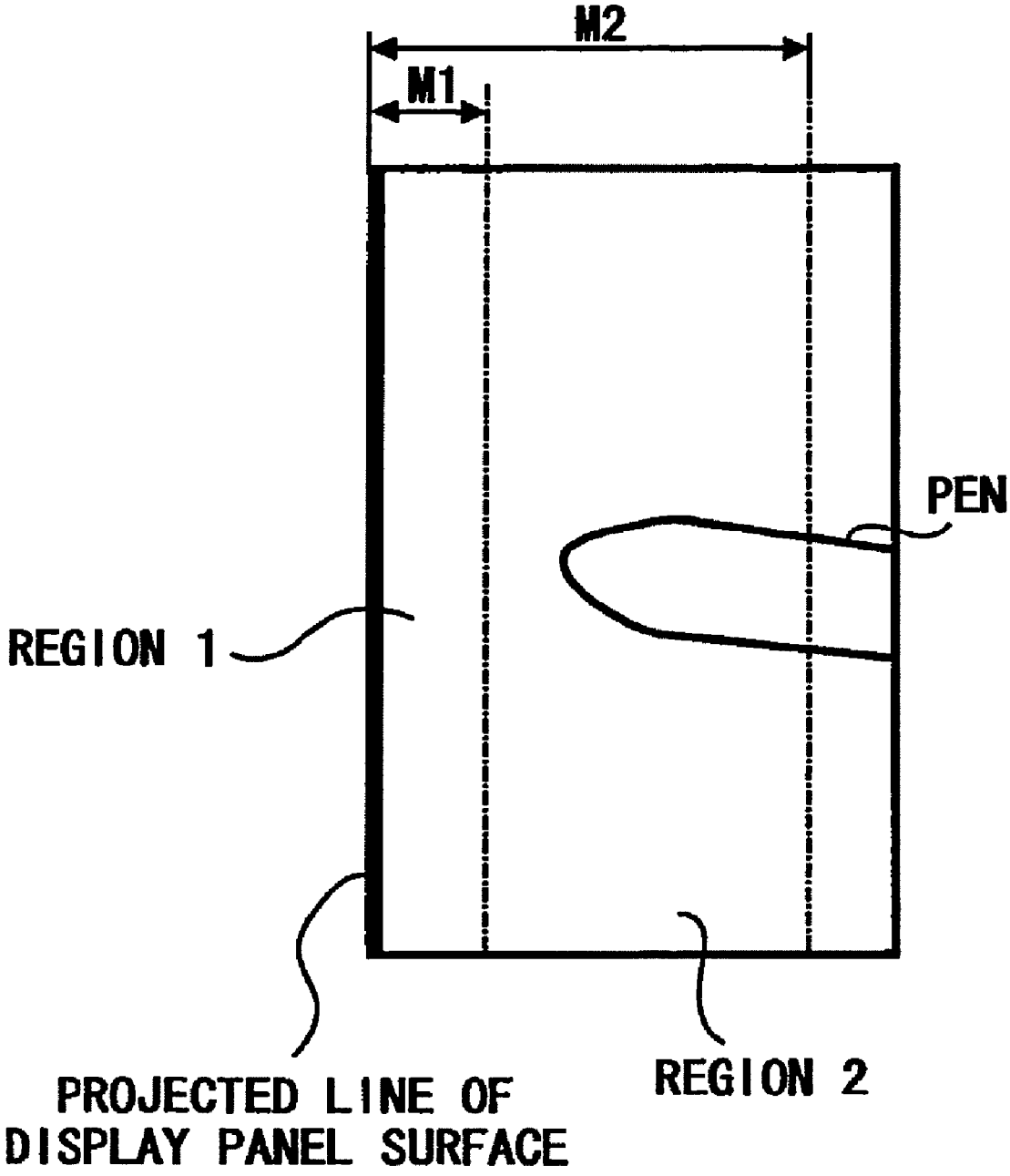
FIG. 24 is a diagram illustrating an image captured by the first electronic camera in the coordinate data input system of FIG. 1.

FIG. 24 is a diagram illustrating an image captured by the first electronic camera 10 in the coordinate data input system 1S of FIG. 1. Referring to FIG. 24, the rectangular region enclosed with a line corresponding to the first predetermined number M1, the projected line of surface of the display panel 12, and the normals thereof is denoted by REGION 1. Likewise, the rectangular region enclosed with the line corresponding to the first predetermined number M1, a line corresponding to the second predetermined number M2, and the normals of the projected line of surface of the display panel 12 is denoted by REGION 2.

The REGION 1 is assigned for tracing motion vectors of the coordinate input member, and the REGION 2 is assigned for moving a cursor, inputting a gesture command, etc. For example, a pen as a coordinate input member is illustrated in the REGION 2 in FIG. 24.

Referring back to FIG. 23, that is to say, in step S1003, the first image processing circuit 30 determines whether the coordinate input member is in the REGION 2. When the result of the determination is true, i.e., YES in step S1003, the process proceeds to step S1004, and when the result is false, i.e., NO in step S1003, the process branches to step S1008.

In step S1004, the first image processing circuit 30 measures a distance h between the optical axis crossing point Q and a projected point P of a contacting point A(x, y) of the object according to the image data received from the first electronic camera 10. Similarly, the second image processing circuit 31 measures a distance h between the optical axis crossing point Q and a projected point P of a contacting point A(x, y) of the object according to the image data received from the second electronic camera 11.

In step S1005, the first image processing circuit 30 solves angle β1 by using the equations (1) and (2), with known quantities f and α, and the measured distance h. As regards image data received from second electronic camera 11, the second image processing circuit 31 solves angle β2 in a similar manner.

In step S1006, referring to FIG. 3, the CPU 20 solves the coordinates x and y of the object on the display panel 12 by using the equations (3) and (4), with known quantities L, and the solved angles β1 and β2.

In step S1007, the CPU 20 generates display data of a cursor at a location according to the obtained coordinates x and y of the object, and sends the generated display data to the display controller 29. The CPU 20 may also send a cursor command to display a cursor at the location. Thus, the display controller 29 can display a cursor at the location where the coordinate input member exists on the display panel 12. After that, the process returns to step S1001. Thus, as long as the coordinate input member moves in the REGION 2, the displayed cursor follows the coordinate input member.

In step S1008, the first image processing circuit 30 determines whether the minimum value Nmin is equal to or smaller than the first predetermined number M1. That is to say, the first image processing circuit 30 determines whether the coordinate input member is in the REGION 1. When the result of the determination is true, i.e., YES in step S1008, the process proceeds to step S1009, and when the result is false, i.e., NO in step S1008, the process returns to step S1001.

In step S1009, the first image processing circuit 30 calculates motion vectors regarding predetermined plural points on the extracted contours of the object including the nearest point to the display panel 12 by using the identical frame image data used for extracting the contours and the next following frame image data received from the first electronic camera 10. After that, the CPU 20 determines whether the extracted object has made an attempt to input coordinates on the display panel 12 based on the trace data of the calculated motion vectors.

When the CPU 20 determines that the object has made an attempt to input coordinates, the first image processing circuit 30 measures a distance h between the optical axis crossing point Q and a projected point P of a contacting point A(x, y) of the object according to the image data received from the first electronic camera 10. Similarly, the second image processing circuit 31 measures a distance h between the optical axis crossing point Q and a projected point P of a contacting point A(x, y) of the object according to the image data received from the second electronic camera 11.

Then, the first image processing circuit 30 solves angle β1 by using the equations (1) and (2), with known quantities f and α, and the measured distance h. As regards image data received from the second electronic camera 11, the second image processing circuit 31 solves angle β2 in a similar manner.

After that, referring to FIG. 3, the CPU 20 solves the coordinates x and y of the object on the display panel 12 by using the equations (3) and (4), with known quantities L, and the solved angles β1 and β2.

In the above-described example, the CPU 20 solves the coordinates x and y of the object on the display panel 12 for every frame image input. However, the CPU 20 may also solve coordinates x and y for every plural frames of images.

In addition, in the above-described example, the obtained coordinates x and y on the display panel 12 in the REGION 2 is used for moving a cursor. However, the obtained coordinates x and y may also be used for another use, such as inputting a gesture command. For inputting a gesture command, the CPU 20 may stores plural sets of coordinate data, i.e., trace data of coordinate data including time stamps thereof. Then, the CPU 20 analyzes the trace data of coordinate data, and tests whether the trace data coincides one of a plurality of defined locus of commands, which may be stored in the hard disk 27 in advance.

As an example, Japanese Laid-Open Patent Publication No. 5-197810 describes a matching method. The method first obtains a set of a temporal combination and a spatial combination of motion vectors extracted from input images. The method then verifies the obtained set of temporal combination and spatial combination with patterns in a command pattern dictionary provided in advance. Thus, the method identifies the input command as a specific one in the command pattern dictionary.

As an example of gesture commands, when an operator strokes a pen downwardly at a predetermined range of velocity in the REGION 2 above the display panel 12, the CPU 20 may recognize the stroke as a scroll command. When the CPU 20 recognizes as a scroll command, the CPU 20 scrolls the image displayed on the display panel 12 downwardly for a predetermined length, for example, the same length to the input stroke.

Further, inputting either a gesture command or coordinate data may be distinguished according to a figure of the coordinate input member. For example, when a human hand or finger draws a figure on the display panel 12, the coordinate data input system 1S may recognize the motion as a gesture command, and when a symmetrical object, such as a pen, draws, the system 1S may input coordinates of the symmetrical object.

Figure 25:
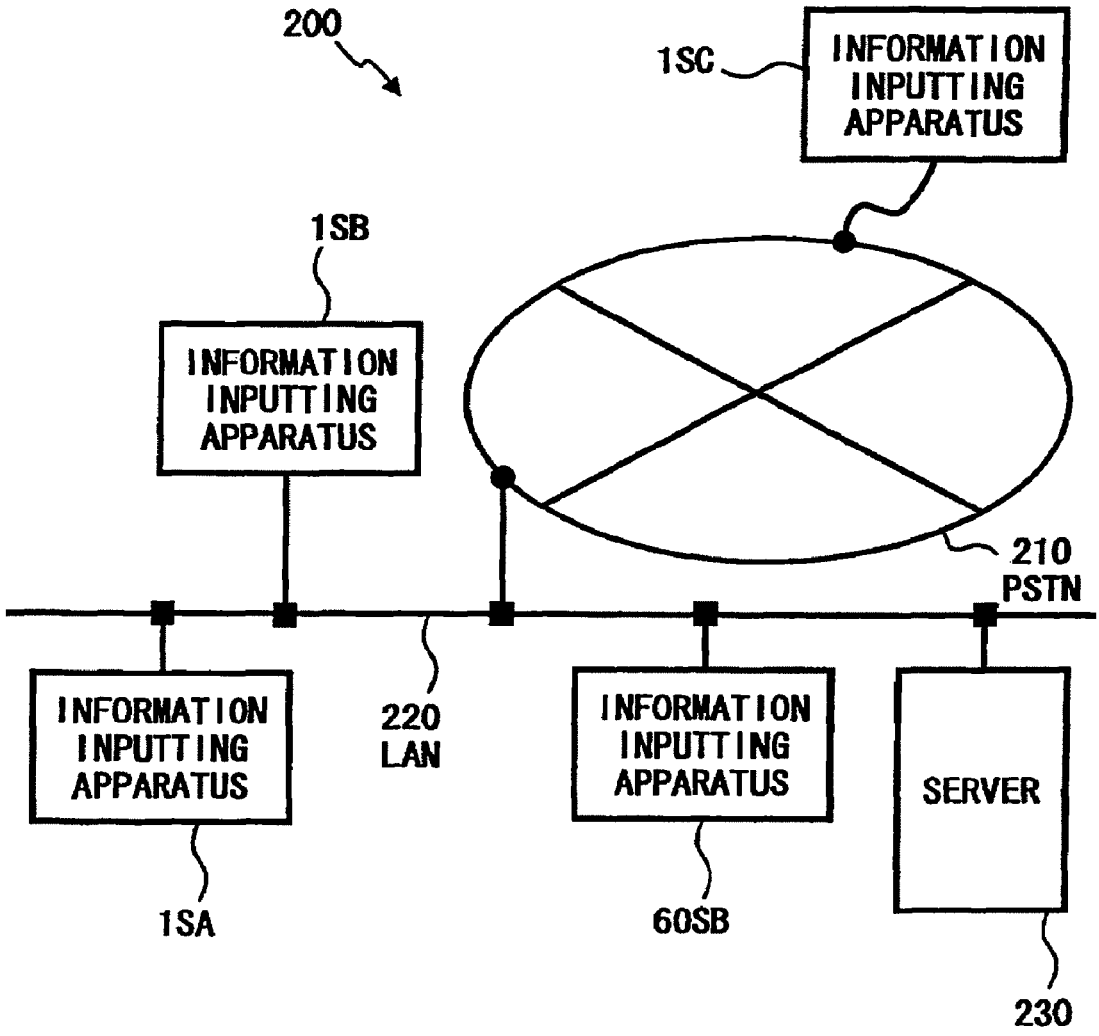
FIG. 25 is an exemplary network system including the coordinate data input systems of FIG. 1 and FIG. 17.

FIG. 25 is an exemplary network system 200 including the coordinate data input systems of FIG. 1 and FIG. 17. Referring to FIG. 25, the network system 200 includes a public switched telephone network (PSTN) 210 and a local area network 220. Three coordinate data input systems 1SA, 1SB and 60SB are connected to the LAN 220 via the LAN interface 33 of FIG. 2 and FIG. 18. A server 230 is also connected to the LAN 220. A coordinate data input system 1SC is connected to the PSTN 210 via the LAN interface 33 and a PSTN adaptor. The coordinate data input systems 1SA, 1SB and 1SC are substantially the same to the coordinate data input system of FIG. 1, and the coordinate data input system 60SB is substantially the same to the coordinate data input system of FIG. 17.

In the network system 200, each of the coordinate data input systems 1SA, 1SB, 1SC and 60SB transmits detected coordinate data of a coordinate input member and related information, such as a gesture command, accompanying control signals according to a transmission control protocol to the other coordinate data input systems via the PSTN 210 and the LAN 220.

Further, each of the coordinate data input systems 1SA, 1SB, 1SC and 60SB displays images on the display panel 12 of FIG. 1 or 73 of FIG. 17 according to the detected coordinate data and the related information sent from the other coordinate data input systems via the PSTN 210 and the LAN 220 in addition to according to coordinate data detected by itself.

Therefore, all the coordinate data input systems 1SA, 1SB, 1SC and 60SB can share identical information and display an identical image on the display panel 12 or 73. In other words, people in different places can input information including coordinate data to a coordinate data input system implemented in each of the different places, and watch substantially the same image on the each display panel.

The server 230 stores programs to be executed by the CPU 20 of FIG. 2 and FIG. 18, the first image processing circuit 30 of FIG. 2, the second image processing circuit 31 of FIG. 2, the first image processing circuit 90 of FIG. 18, the second image processing circuit 91 of FIG. 18, the third image processing circuit 92 of FIG. 18, etc.

When a manufacturer of the coordinate data input systems revises a program of the systems, the manufacturer stores the revised program and informs users of the systems of the new program revision. Then, the users of the coordinate data input systems can download the revised program into hard disk 27 of FIG. 2 and FIG. 18, and thus programs for the CPU and the image processing circuits of each system are updated. When updating operations for the coordinate data input systems connected to the PSTN 210 and the LAN 220 are completed, all users of the systems can share, for example, the latest functions of the system. *As used herein, "computer readable medium" means a non-transitory hardware implementation, such as the afore-mentioned hard disk 27, CD-ROM 27, ROM 24, main memory 21, etc.*

As described above, the novel method and apparatus according to the present invention can input information including coordinate data without using a light scanning device even when the surface of a display screen is contorted to a certain extent.

Further, the novel method and apparatus according to the present invention can input information including coordinate data using a plurality of coordinate input members, such as a pen, a human finger, a stick, etc.

Furthermore, the novel method and apparatus according to the present invention can input information including coordinate data with a plurality of background devices, such as a chalkboard, a whiteboard, etc., in addition to a display device, such as a plasma display panel, a rear projection display.

Numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

The invention claimed is:

1. A method for inputting information including coordinate data, comprising:

providing at least two cameras at respective corners of a display;

extracting, based on outputs from the at least two cameras, a predetermined object from an image including the predetermined object above a plane of the display and a plane of the display;

determining whether the predetermined object is within a predetermined distance from the plane of the display;

detecting, based on outputs from the at least two cameras, a position of the predetermined object while the predetermined object is determined to be within a predetermined distance from the plane;

calculating angles of views of each of the at least two cameras to the detected position; and calculating coordinates of the predetermined object on the display panel utilizing the calculated angles.

2. A method for inputting information including coordinate data according to claim 1, wherein the at least two cameras are in opposite corners of the display.

3. A device for inputting information including coordinate data, comprising:

at least two cameras at respective corners of a display;

an object extracting device configured to extract a predetermined object from an image including the predetermined object above a plane of the display and a plane of the display, and to determine whether the predetermined object is within a predetermined distance from the plane of the display;

a detector device configured to detect a position of the predetermined object while the predetermined object is within a predetermined distance from the plane; and a controller configured to calculate angles of views of each of the at least two cameras to the detected position and to calculate coordinates of the predetermined object on the display panel utilizing the calculated angles.

4. A device for inputting information including coordinate data according to claim 3, wherein the at least two cameras are in opposite corners of the display.

5. A device for inputting information including coordinate data, comprising:

at least two imaging means at respective corners of a display;

means for extracting, based on outputs from the at least two imaging means, a predetermined object from an image including the predetermined object above a plane of the display and a plane of the display, and for determining whether the predetermined object is within a predetermined distance from the plane of the display;

means for detecting, based on outputs from the at least two imaging means, a position of the predetermined object while the predetermined object is within a predetermined distance from the plane;

means for calculating angles of view of each of the least two imaging means and for calculating coordinates of the predetermined object on the display panel utilizing the calculated angles.

6. A device for inputting information including coordinate data according to claim 5, wherein the at least two imaging means are in opposite corners of the display.

*7. Apparatus usable with at least one processing structure for inputting information including coordinate data, comprising:*

*a display device having at least two cameras at respective corners thereof; and*

*at least one non-transitory computer readable medium having program code configured to cause the at least one processing structure to:*

*(i) extract, based on outputs from the at least two cameras, a predetermined object from an image including the predetermined object above a plane of the display device and a plane of the display device;*

*(ii) determine whether the predetermined object is within a predetermined distance from the plane of the display device;*

*(iii) detect, based on outputs from the at least two cameras, a position of the predetermined object while the predetermined object is determined to be within a predetermined distance from the plane;*

*(iv) calculate angles of views of each of the at least two cameras to the detected position; and*

*(v) calculate coordinates of the predetermined object on the display device utilizing the calculated angles.*

*8. Apparatus usable with at least one processing structure for inputting information including coordinate data accord-*

*ing to claim 7, wherein the at least two cameras are disposed at opposite corners of the display device.*

*9. Apparatus usable with at least one processing structure for inputting information including coordinate data, comprising:*

*a display having at least two cameras at respective corners thereof; and*

*at least one non-transitory computer readable medium configured to cause the at least one processing structure to:*

*(i) extract a predetermined object from an image including the predetermined object above a plane of the display and a plane of the display, and to determine whether the predetermined object is within a predetermined distance from the plane of the display;*

*(ii) detect a position of the predetermined object while the predetermined object is within a predetermined distance from the plane; and*

*(iii) calculate angles of views of each of the at least two cameras to the detected position and to calculate coordinates of the predetermined object on the display panel utilizing the calculated angles.*

*10. Apparatus usable with at least one processing structure for inputting information including coordinate data according to claim 9, wherein the at least two cameras are disposed at opposite corners of the display.*

*11. Apparatus usable with at least one processing structure for inputting information including coordinate data, comprising:*

*a display panel having at least two imaging devices at respective corners thereof; and*

*at least one non-transitory computer readable medium configured to cause the at least one processing structure to:*

*(i) extract, based on outputs from the at least two imaging devices, a predetermined object from an image including the predetermined object above a plane of the display panel and a plane of the display panel, and for determining whether the predetermined object is within a predetermined distance from the plane of the display panel;*

*(ii) detect, based on outputs from the at least two imaging devices, a position of the predetermined object while the predetermined object is within a predetermined distance from the plane; and*

*(iii) calculate angles of view of each of the least two imaging devices, and calculate coordinates of the predetermined object on the display panel utilizing the calculated angles.*

*12. Apparatus usable with at least one processing structure for inputting information including coordinate data according to claim 11, wherein the at least two imaging devices are disposed at opposite corners of the display panel.*

* * * * *